US010364350B2

(12) United States Patent
Nallani et al.

(10) Patent No.: US 10,364,350 B2
(45) Date of Patent: Jul. 30, 2019

(54) VESICULAR SYSTEM AND USES THEREOF (75) Inventors: Madhavan Nallani, Singapore (SG);
Eva-Kathrin Sinner, Vienna (AT);
Madanagopal Kunnavakkam,
Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 0 days.

(21) Appl. No.: 13/265,322

(22) PCT Filed: Apr. 20, 2010

(86) PCT No.: PCT/SG2010/000159
§ 371 (c)(1),
(2), (4) Date: Feb. 7, 2012

(87) PCT Pub. No.: WO2010/123462
PCT Pub. Date: Oct. 28, 2010

(65) Prior Publication Data
US 2012/0129270 A1    May 24, 2012

Related U.S. Application Data (60) Provisional application No. 61/202,920, filed on Apr. 20, 2009.

(51) Int. Cl.
C12N 15/09     (2006.01)
C08L 71/02     (2006.01)
C08G 65/329    (2006.01)

(52) U.S. Cl.
CPC ............ *C08L 71/02* (2013.01); *C08G 65/329* (2013.01); *C08L 2203/02* (2013.01)

(58) Field of Classification Search
None
See application file for complete search history.

(56) References Cited

U.S. PATENT DOCUMENTS

| | | | |
|---|---|---|---|
| 4,931,498 A | 6/1990 | Pidgeon | |
| 6,048,546 A | 4/2000 | Sasaki et al. | |
| 7,288,368 B2 | 10/2007 | Zweig | |
| 7,314,725 B2 | 1/2008 | Drayna et al. | |
| 7,455,982 B2 | 11/2008 | Barak et al. | |
| RE40,594 E | 12/2008 | Margolskee et al. | |
| 7,468,255 B2 | 12/2008 | Xu et al. | |
| 2003/0008331 A1 | 1/2003 | Lerner | |
| 2005/0048110 A1 | 3/2005 | Discher et al. | |
| 2007/0116733 A1 | 5/2007 | Graneli et al. | |

FOREIGN PATENT DOCUMENTS

| | | |
|---|---|---|
| WO | 2000073798 A1 | 12/2000 |
| WO | WO 01/32146 A2 | 5/2001 |
| WO | 2005049833 A1 | 6/2005 |
| WO | 2006107506 A2 | 10/2006 |
| WO | WO 2007/038763 A1 | 4/2007 |
| WO | WO 2007/048459 A1 | 5/2007 |
| WO | 2008091306 A2 | 7/2008 |

OTHER PUBLICATIONS

PCT International Search Report for PCT Counterpart Application No. PCT/SG2010/000159 containing Communication relating to the Results of the International Search Report, 4 pgs., (dated Jul. 7, 2010).
PCT Written Opinion of the International Searching Authority for PCT Counterpart Application No. PCT/SG2010/000159, 4 pgs., (dated Jul. 7, 2010).
PCT International Preliminary Report on Patentability (Chapter II of the Patent Cooperation Treaty) for PCT Counterpart Application No. PCT/SG2010/000159, 8 pages, (dated Feb. 23, 2011).
Matthew A. Cooper, "Advances in Membrane Receptor Screening and Analysis", Journal of Molecular Recognition, vol. 17, pp. 286-315, (2004).
Dennis E. Discher, et al., "Polymer Vesicles", Science, vol. 297, pp. 967-973, (Aug. 9, 2002).
Masayuki Hara, et al., "Amphiphilic Polymer-Liposome Interaction: A Novel Immobilization Technique for Liposome on Gel Surface", Materials Science and Engineering: C, vol. 13, pp. 117-121, (2000).
Eva-Kathrin Sinner, et al., "Self-Assembled Tethered Bimolecular Lipid Membranes", Advances in Clinical Chemistry, vol. 49, pp. 159-179, (2009).
W. Knoll, et al., "Functional Tethered Lipid Bilayers", Reviews in Molecular Biotechnology, vol. 74, pp. 137-158, (2000).
Bin Liu, et al., "Characterization of TectoRNA Assembly with Cationic Conjugated Polymers", Journal of the American Chemical Society, vol. 126, pp. 4076-4077, (2004).
Birgit Wiltschi, et al., "Binding Assays with Artificial Tethered Membranes using Surface Plasmon Resonance", Methods, vol. 39, pp. 134-146, (2006).
Nancy L. Thompson, et al., "Recent Advances in Fluorescence Correlation Spectroscopy", Current Opinion in Structural Biology, vol. 12, pp. 634-641, (2002).
Hanno Steen, et al., "Analysis of Protein-Nucleic Acid Interactions by Photochemical Cross-Linking and Mass Spectrometry", Mass Spectrometry Reviews, vol. 21, pp. 163-182, (2002).
Richard A. Rippe, et al., "Techniques to Measure Nucleic Acid-Protein Binding and Specificity: Nuclear Extract Preparations, DNase I Footprinting, and Mobility Shift Assays", Methods in Molecular Biology, vol. 160, pp. 459-479, (2001).

(Continued)

*Primary Examiner* — Michael D Pak
(74) *Attorney, Agent, or Firm* — Womble Bond Dickinson (US) LLP (57) ABSTRACT

Disclosed is a vesicular system comprising a surface with a vesicle immobilized thereon. The immobilized vesicle has a circumferential membrane of an amphiphilic polymer. The vesicle is coupled to a surface by means of a molecule with a non-polar moiety. The non-polar moiety comprises a main chain of 3 to about 30 carbon atoms and 0 to about 12 heteroatoms selected from Si, O, S, and Se. The molecule with the non-polar moiety is coupled to the surface via a covalent or non-covalent bond. A portion of the non-polar moiety is integrated in the circumferential membrane.

6 Claims, 5 Drawing Sheets

(56) References Cited

OTHER PUBLICATIONS

Adrian Velazquez-Campoy, et al., "Characterization of Protein-Protein Interactions by Isothermal Titration Calorimetry", Methods in Molecular Biology, vol. 261, pp. 35-54, (2004).
Masayuki Hara, et al., "Interaction between a Novel Amphiphilic Polymer and Liposomes", Supramolecular Science, vol. 5, pp. 777-781, (1998).
Feng Li, et al., "Gentle Immobilization of Nonionic Polymersomes on Solid Substrates", Langmuir, vol. 24, pp. 76-82, (2008).
Communication containing the Extended European Search Report corresponding European Patent Application No. 10767402.0, 4 pages, (dated Oct. 12, 2012).
Examination Report for EP Application No. 10767402.0, (dated Jun. 25, 2013), 4 pages.
Noireaux, V., et al., "Toward an artificial cell based on gene expression in vesicles", Phys. Biol. 2, (2005), p. 1-p. 8.
Search Report issued by the Hungarian Intellectual Patent and Trademark Office for corresponding Singapore Patent Application No. 201107609-8, 9 pages, (dated Feb. 27, 2014).
Written Opinion issued by the Hungarian Intellectual Patent and Trademark Office for corresponding Singapore Patent Application No. 201107609-8, 10 pages, (dated Oct. 21, 2014).
Dimitrios Stamou, et al., "Self-Assembled Microarrays of Attoliter Molecular Vessels", Angewandte Chemie International Edition, vol. 42, No. 45, pp. 5580-5583, (2003).
Chiaki Yoshina-Ishii, et al., "Arrays of Mobile Tethered Vesicles on Supported Lipid Bilayers", Journal of the American Chemical Society, vol. 125, No. 13, pp. 3696-3697, (2003).
Horst Pick, et al., "Investigating Cellular Signaling Reactions in Single Attoliter Vesicles", Journal of the American Chemical Society, vol. 127, No. 9, pp. 2908-2912, (2005).
Vincent Noireaux, et al., "A Vesicle Bioreactor as a Step toward an Artificial Cell Assembly", Proceedings of the National Academy of Sciences, vol. 101, No. 51, pp. 17669-17674, (Dec. 21, 2004).
Indriati Pfeiffer, et al., "Bivalent Cholesterol-Based Coupling of Oligonucletides to Lipid Membrane Assemblies", Journal of the American Chemical Society, vol. 126, No. 33, pp. 10224-10225, (2004).
Ghania G. Chikh, et al., "Attaching Histidine-Tagged Peptides and Proteins to Lipid-Based Carriers through Use of Metal-Ion-Chelating Lipids", Biochimica et Biophysica Acta, vol. 1567, pp. 204-212, (2002).
Holthius, J. C., et al., "Lipid landscapes and pipelines in membrane homeostasis", *Nature*, vol. 510, (Jun. 5, 2014), 48-57.

Katzen, F., et al., "Membrane protein expression: no cells required", *Trends in Biotechnology*, vol. 27, No. 8, (2009), 455-460.
Lopresti, C., et al., "Polymersomes: nature inspired nanometer sized compartments", *J. Mater. Chem.*, vol. 19, (2009), 3576-3590.
Meier, W., et al., "Reconstitution of Channel Proteins in (Polymerized) ABA Triblock Copolymer Membranes", *Angew. Chem. Int. Ed.*, vol. 39, No. 24, (2000), 4599-4602.
Andreasson-Ochsner, M., et al., "Selective Deposition and Self-Assembly of Triblock Copolymers into Matrix Arrays for Membrane Protein Production", *Langmuir*, 28, (2012), 2044-2048.
May, S., et al., "In vitro expressed GPCR inserted in polymersome membranes for ligand binding studies", *Angewandte Chemie. Int. Edition*, 52, (2013), 749-753.
Nallani, M., et al., "In vitro production of a membrane protein in polymersome membranes", *Biointerphases*, 6, (2011), 153-157.
Tan, D. et al., "A novel microfluidics-based method for probing weak protein-protein interactions", *Lab on a Chip*, 12, (2012), 2726-2735.
De Hoog, Hans-Peter M., et al., "Conformational Antibody Binding to a Native, Cell-Free Expressed GPCR in Block Copolymer Membranes", *PLOS ONE*, vol. 9, No. 10, (Oct. 2014), 1-7.
De Hoog, Hans-Peter M., et al., Materials and methods used in the experiments, Supplement to "Conformational Antibody Binding to a Native, Cell-Free Expressed GPCR in Block Copolymer Membranes", *PLOS ONE* (Oct. 2014).
Promega Corporation, "TnT Quick Coupled Transcription/Translation Systems", (Jun. 2015), pp. 1-32.
Rosenthal, et al., "Claudin-2, a component of the tight junction, forms a paracellular water channel", Journal of Cell Science 123, Mar. 22, 2010, 1913-1921.
Breer, "Olfactory receptors: molecular basis for recognition and discrimination of odors," Anal. & Bioanal. Chem., vol. 377, No. 3, pp. 427-433; 2003.
Taubert et al., "Self-assembly of reactive amphiphilic block copolymers as mimetics for biological membranes," Current Opinion in Chemical Biology, 2004, vol. 8, No. 6, pp. 598-603.
Battaglia et al., "Bilayers and intergiditation in block copolymer versicles," J. Am. Chem. Soc., 2005, vol. 127, No. 24, pp. 8757-8764.
Robelek et al., "Incorporation of in Vitro synethesized GPCR into a tethered artificial lipid membrane system," Angew. Chem. Int. Ed, 2007, vol. 46, No. 4, pp. 605-608.
Bermudez, et al., "Effect of Bilayer Thickness on Membrane Bending Rigidity," Langmuir, 2004, vol. 20, pp. 540-543.
Buck, "Unraveling the Sense of Smell (Nobel Lecture)," Angew. Chem. Int. Ed., 2005, vol. 44, pp. 6128-6140.
Cornell et al., "A biosensor that uses ion-channel switches," Nature, 1997, vol. 387, pp. 580-583.

VESICULAR SYSTEM AND USES THEREOF

CROSS REFERENCE TO RELATED APPLICATIONS

This patent application is a U.S. National Phase application under 35 U.S.C. § 371 of International Application No. PCT/SG2010/000159, filed Apr. 20, 2010, entitled VESICULAR SYSTEM AND USES THEREOF, which makes reference to and claims the benefit of priority of a provisional application for a "Vesicular Platform For High Throughput Membrane Protein Expression" filed on Apr. 20, 2009 with the United States Patent and Trademark Office, and there duly assigned Ser. No. 61/202,920. The content of said application filed on Apr. 20, 2009 is incorporated herein by reference for all purposes, including an incorporation of any element or part of the description, claims or drawings not contained herein and referred to in Rule 20.5(a) of the PCT, pursuant to Rule 4.18 of the PCT.

FIELD OF THE INVENTION

The present invention relates to a vesicular system and uses thereof. The system is defined by a surface with a vesicle immobilized thereon. Disclosed is also a method of associating a membrane protein with the membrane of the vesicle, including integrating the membrane protein into the same. In some embodiments the system is defined by a surface decorated with immobilized vesicles hosting membrane proteins.

BACKGROUND OF THE INVENTION

Cell membranes are self assembling boundaries of a living cell or of internal compartments thereof, defined by a bilayer architecture based on lipids. Membrane proteins are large, amphiphilic moieties with subtle function-structure dependencies. Membrane proteins can be associated with the membrane to different degrees. A classical differentiation classified membrane proteins according to the conditions required to solubilise the same. "Peripheral" membrane proteins can be dissociated from the membrane by relatively mild conditions such as increased ionic strength or a change in pH. "Integral" membrane proteins can only be dissociated from the membrane by means of detergents or organic solvents. Such "integral" membrane proteins include proteins that are now known to span the entire membrane, proteins known to be partially embedded within an outer portion of the membrane such as prostaglandin $H_2$ synthase-1, but also some proteins that interact with the membrane via hydrophobic posttranslational modifications such as heterotrimeric G proteins.

It is an extremely challenging task to provide a biomimetic structure that allows preserving the functional structure of a membrane protein, which has a portion that is included in a cellular membrane in vivo. The conventional detergent-based isolation methods of membrane proteins and addition to surfaces results in their random orientation after incorporation. The conventional approach does not allow a complex membrane protein to be incorporated in a form which maintains the availability and functional presentation of the protein. This is critical for any application, in particular, biosensing and drug discovery. Furthermore, it is difficult to maintain the robustness of a conventional membrane layer on a surface when it is formed from traditional phospholipid materials.

Membrane proteins play a crucial role in many functions involving interaction, including communication, with a cell's ambience, which are usually important to an individual cell as well as to an organ and an organism that includes the same. Prominent examples are cellular signalling, selective transport of components into and out of the cell or cell-cell interactions. About 50% of the drug targets are membrane proteins. Membrane proteins are for example involved in visual perception, olfaction and taste reception. Important examples of proteins with membrane spanning domains, G protein-coupled receptors (GPCRs) tyrosine kinase receptors, receptor channels (usually termed ionotropic receptors, e.g. glutamate receptor channels) and TOL-like-receptors are key signaling receptors in cells. Despite their importance, detailed functional studies of membrane proteins are still scarce because of their sensitivity and notorious difficult procedures of isolation and functional re-constitution.

While a variety of assay techniques is meanwhile available for screening of membrane receptors (for an overview see e.g. Cooper, M A, *J. Mol. Recognit.* (2004) 17, 286-315), a reconstitution system for easily handling the same is still unavailable. Strategies available in the art to analyse the functions of membrane proteins include membrane-based model systems as well as cell-based model systems. The standard protocols typically followed have remained essentially unchanged over the last decades and involve either vesicles formed from detergents or fragments obtained from biological cell membranes (e.g. ibid.).

Figure 1:
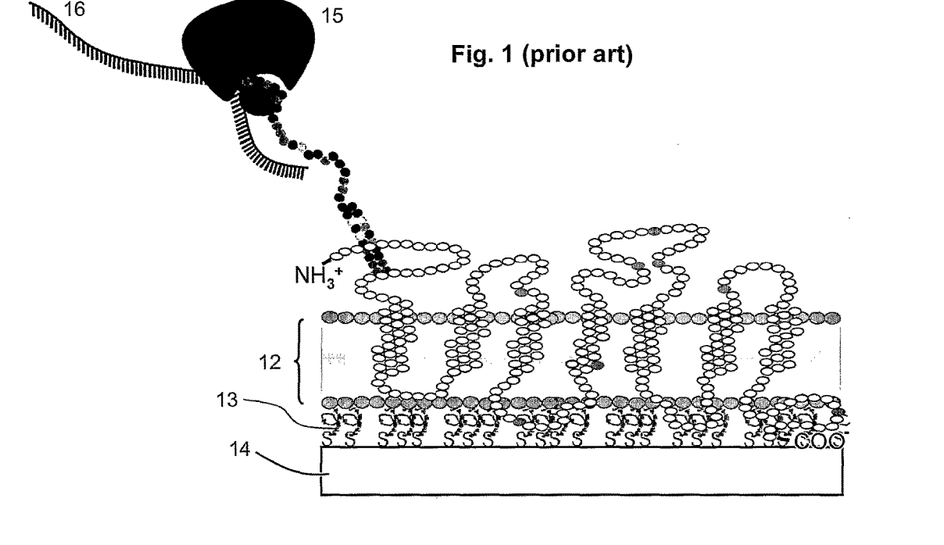
FIG. 1 depicts the direct synthesis and incorporation of functional proteins demonstrated in artificial lipid planar bilayer membranes tethered on a gold substrate as disclosed in PCT/EP2006/008318 (12: model membrane; 13: spacer (peptide); 14: metal or metalloid substrate; 15: ribosome; 16: plasmid DNA).

In an approach of mimicking a biological membrane situation, vesicles of synthetic amphiphilic linear block co-polymers with polar terminal groups have been formed (cf. e.g. Disher, D E, et al., *Science* (2002) 297, 967-973). In a further approach, an artificial membrane of a layer of dimyristoylphosphatidylethanolamine and a layer of phosphatidyl-choline has been formed on a gold substrate (international patent application WO 2007/048459, cf. FIG. 1). To allow analysing the function of membrane proteins encompassed by the membrane, direct contact between membrane proteins and the solid support is avoided by means of a hydrophilic peptide layer, acting as a macromolecular spacer (ibid.). Synthesis and incorporation of membrane proteins onto this tethered bilayer membrane architecture have been monitored by Surface Plasmon enhanced Fluorescence Spectroscopy (SPFS), immuno-assays (Western Blot), Surface Enhanced Infrared Spectroscopy (SEIRAS) and radioactive labeling. With this system, direct synthesis of membranes in an artificial environment, as well as characterization of membrane proteins on a molecular level can be achieved. However, mechanical strength is compromised as a result of the fragile nature of the membrane formed by phospholipids. In addition, it is difficult to incorporate this technology into a multi-well format. Therefore there remains a need for an alternative approach of providing an artificial membrane.

Accordingly, it is an object of the present invention to provide a robust architecture of or with an artificial membrane that is well suited for assay development, analysis and screening purposes.

SUMMARY OF THE INVENTION

The present invention provides a chemically and mechanically robust surface-bound architecture of an artificial membrane, combining the presence of a surface with the strength of a large surface of bulk-phase materials. In addition, the invention overcomes intrinsic difficulties of phospholipid-based membranes as protein embedding materials, by allowing the use of synthetic materials, such as block-copolymers. Their compatibility with in vitro synthesized complex membrane proteins is shown.

According to a first aspect, the invention provides a vesicular system. The vesicular system includes a surface with a vesicle immobilized thereon. The immobilized vesicle has a circumferential membrane of an amphiphilic polymer. The vesicle is coupled to a surface by means of a molecule with a non-polar moiety. The non-polar moiety is selected from an aliphatic, an alicyclic, an aromatic and an arylaliphatic moiety. The non-polar moiety includes a main chain of 3 to about 30 carbon atoms and 0 to about 12 heteroatoms. The heteroatoms are selected from Si, O, S, and Se. The molecule with the non-polar moiety is coupled to the surface via a covalent or non-covalent bond. A portion of the non-polar moiety is integrated into the circumferential membrane of the vesicle.

In some embodiments the vesicular system is an aqueous system. The surface is in such an embodiment in contact with an aqueous medium, in which the vesicle immobilized thereon is included, e.g. immersed.

According to a second aspect, the invention provides a method of forming a vesicular system according to the first aspect. The method includes providing a vesicle. This vesicle has a circumferential membrane of an amphiphilic polymer. The method also includes providing a molecule with a non-polar moiety. The non-polar moiety is one of an aliphatic, an alicyclic, an aromatic and an arylaliphatic moiety. The non-polar moiety of this molecule includes a main chain of 3 to about 30 carbon atoms and 0 to about 12 heteroatoms. The heteroatoms are selected from Si, O, S, and Se. Further, the method includes providing a surface. The method also includes coupling in a polar solvent the molecule with the non-polar moiety to the surface. The molecule with the non-polar moiety is coupled to the surface in the presence of the vesicle. The method according to the second aspect can thus also be taken to be a method of immobilizing a vesicle. The vesicle that is immobilized has a circumferential membrane of an amphiphilic polymer.

According to a third aspect, the invention provides a process of forming an immobilized vesicle with an associated membrane protein. The process includes providing an immobilized vesicle in a vesicular system according to the first aspect. The process also includes contacting the immobilized vesicle at suitable conditions with a cell free expression system and with a nucleic acid molecule. The nucleic acid molecule encodes the membrane protein. Further, the process includes allowing the expression of the membrane protein. The process also includes allowing the membrane protein to associate with the membrane of the vesicle.

According to a fourth aspect, the invention provides an in-vitro method of identifying a compound that is capable of forming a complex with a membrane receptor protein. The method includes providing a vesicular system according to the first aspect. The immobilized vesicle of the vesicular system includes a membrane protein. This membrane protein is associated to the circumferential membrane of the amphiphilic polymer of the immobilized vesicle. The membrane protein is the membrane receptor protein. The method includes contacting the immobilized vesicle with a candidate compound. The candidate compound is suspected to be capable of forming a complex with the membrane receptor protein. The method also includes detecting the complex formation between the candidate compound and the membrane receptor protein. The membrane receptor protein may be a receptor protein of a cell membrane, i.e. a cell surface receptor, or of an organelle membrane.

According to a fifth aspect, the invention provides an in-vitro method of identifying a compound that is capable of modulating the function of an ion channel protein. The ion channel protein is capable of allowing a known ion to pass. The method includes providing a vesicular system according to the first aspect. The immobilized vesicle of the vesicular system includes a membrane protein. This membrane protein is associated to the circumferential membrane of the amphiphilic polymer of the immobilized vesicle. The membrane protein is an ion channel protein, which is the ion channel protein that is capable of allowing a known ion to pass. The method includes contacting the immobilized vesicle with a candidate compound. The candidate compound is suspected to modulate the function of the ion channel protein. The method also includes detecting the passage of ions into or out of the vesicle. The ion channel protein may be an ion channel protein of a cell membrane, i.e. a cell surface ion channel, or of an organelle membrane.

BRIEF DESCRIPTION OF THE DRAWINGS

The invention will be better understood with reference to the detailed description when considered in conjunction with the non-limiting examples and the accompanying drawings.

DETAILED DESCRIPTION OF THE INVENTION

The present invention provides an immobilized vesicle. Typically a plurality of immobilized vesicles is provided. The one or more vesicles are immobilized on a surface. It/they may be immobilized on any desired surface. Typically the surface is solid. The surface may be taken to define a wall. It may be of any geometry. It may possess any internal surface characteristics, as long as they allow for the immobilisation of a vesicle of a desired size and circumferential membrane. The surface may for instance be curved, round, straight or flat. It may be arced, such as concave or convex, undulated, or include a dent, a nook or any other geometrical element. The surface or the respective wall may be a part of another, typically larger, surface or wall, respectively. The surface may be of any desired size and dimensions. In some embodiments the surface is the surface of a nanoparticle, such as a nanocrystal. Since the vesicle is coupled to the surface via a molecule that is in turn coupled to the surface, no particular limitations in terms of wettability and polarity apply. The surface or any portion thereof may thus be either non-polar, and thus hydrophilic, or polar, and thus hydrophobic. Furthermore, different portions of the surface may provide different surface characteristics. Thus, some surface/wall-portions may be polar, while others may be non-polar.

Any part of the surface/wall may also be treated in such a way that it provides respective hydrophilic or hydrophobic surface characteristics. A respective treatment may for instance be desired in order to provide a surface that possesses altered, e.g. reduced or negligible, interactions with the liquid of a selected liquid droplet. For example the base region of the reservoir may be treated respectively. In some embodiments the inner walls of the reservoir are furthermore inert against the medium that is desired to be accommodated therein. Such embodiments allow for multiple reusing of the device. An illustrative example of a material that is inert against most corrosive media is a fluoropolymer such as fluoroethylenepropylene (FEP), polytetrafluoroethylene (PFTE, Teflon), ethylene-tetrafluoro ethylene (ETFE), tetrafluoroethylene-perfluoromethylvinylether (MFA), vinylidene fluoride-hexafluoropropylene copolymer, tetrafluoroethylene-hexafluoropropylene copolymer, vinylidene fluoride-hexafluoropropylene-tetrafluoroethylene terpolymer, perfluoromethyl vinyl ether-tetrafluoroethylen copolymer, perfluoroalkoxy copolymer (PFA), poly(vinyl fluoride), polychlorotrifluoroethylene, fluorosilicones, or fluorophosphazenes.

The surface may include any desired material. In some embodiments the surface is of a polymer, in particular a solid polymer. The surface is in some embodiments a metal surface, a metal oxide surface, a metalloid surface or a metalloid oxide surface, or it may include any mixture of a metal, a metalloid, a metal oxide or a metalloid oxide. Examples of suitable metalloids include, but are not limited to silicon, boron, germanium, antimony and composites thereof. Examples of suitable metals include, but are not limited to iron (e.g. steel), aluminium, gold, silver, chromium, tin, copper, indium, titanium, zinc, tantalum, aluminium, lead, strontium and composites thereof. A respective oxide of any of these metalloids and metals may be used as a metalloid oxide or metal oxide respectively. As an illustrative example, the surface may be of quartz or glass. As a further illustrative example, a silicon oxide or germanium oxide surface may be obtained by etching a silicon substrate or germanium substrate, respectively, with piranha solution, i.e. a mixture of sulphuric acid and hydrogen peroxide solution at a molar ratio of 7:3.

In some embodiments the surface is defined by a circumferential wall, which defines a recess. The respective recess may be capable of encompassing a predefined volume of a medium, including an aqueous medium. In some embodiments the surface is the circumferential wall of a multi-well plate.

The vesicle has a circumferential membrane and an interior, which is typically defined by a single compartment. A respective vesicle can be taken to have a core-shell build-up. Generally the vesicle is spherical and can be taken to be of a micelle type. The interior that is typically defined by a hydrophilic liquid. Hydrophilic ("water-loving") liquids, also termed lipophilic ("fat-loving"), contain molecules which can form dipole-dipole interactions with water molecules and thus dissolve therein. Such liquids are thus generally polar. Hydrophilic ("water-hating") liquids, also termed lipophobic, have a tendency to separate from water. Such liquids are thus generally non-polar. Examples of a hydrophilic liquid include, but are not limited to water, acetone, methanol, ethanol, propanol, isopropanol, butanol, tetrahydrofuran, pyridine, chloroform, ethylene glycol monobutyl ether, pyridine, ethyl acetate, acetonitrile, dimethylformamide, N,N-dimethyl acetamide, N-methylpyrrolidone, formic acid, formamide, and a polar ionic liquid. Examples of a polar ionic liquid include, but are not limited to, 1-ethyl-3-methylimidazolium tetrafluoroborate, N-butyl-4-methylpyridinium tetrafluoroborate, 1,3-dialkylimidazolium-tetrafluoroborate, 1,3-dialkylimidazolium-hexafluoroborate, 1-ethyl-3-methylimidazolium bis (pentafluoroethyl)phosphinate, 1-butyl-3-methylimidazolium tetrakis-(3,5-bis(trifluoromethylphenyl) borate, tetrabutyl-ammonium bis(trifluoromethyl)imide, ethyl-3-methylimidazolium trifluoromethanesulfonate, 1-butyl-3-methylimidazolium methylsulfate, 1-n-butyl-3-methylimidazolium ([bmim]) octylsulfate, and 1-n-butyl-3-methylimidazolium tetrafluoroborate. Examples of a non-polar liquid include, but are not limited to mineral oil, hexane, heptane, cyclohexane, benzene, toluene, dichloromethane, chloroform, carbon tetrachloride, carbon disulfide, dioxane, diethyl ether, diisopropylether, methyl propyl ketone, methyl isoamyl ketone, methyl isobutyl ketone, cyclohexanone, isobutyl isobutyrate, ethylene glycol diacetate, and a non-polar ionic liquid. Examples of a non-polar ionic liquid include, but are not limited to, 1-ethyl-3-methylimidazolium bis[(trifluoromethyl)sulfonyl]amide bis-(triflyl)amide, 1-ethyl-3-methylimidazolium bis[(trifluoromethyl)sulfonyl]amide trifluoro-acetate, 1-butyl-3- methylimidazolium hexafluorophosphate, 1-hexyl-3-methylimidazolium bis-(trifluoromethylsulfonyl)imide, 1-butyl-3-methylimidazolium bis(trifluoromethylsulfonyl) imide, trihexyl(tetradecyl)phosphonium bis[oxalato(2-)]borate, 1-hexyl-3-methyl imidazolium tris(pentafluoroethyl) trifluorophosphate, 1-butyl-3-methyl-imidazolium hexafluorophosphate, tris(pentafluoroethyl)trifluorophosphate, trihexyl(tetradecyl)phosphomium, N"-ethyl-N,N,N', N'-tetramethylguanidinium, 1-butyl-1-methyl pyrrolidinium tris(pentafluoroethyl)trifluoro-phosphate, 1-butyl-1-methyl pyrrolidinium bis(trifluoromethylsulfonyl)imide, 1-butyl-3-methyl imidazolium hexafluorophosphate, 1-ethyl-3-methylimidazolium bis(trifluoromethyl-sulfonyl)imide and 1-n-butyl-3-methylimidazolium.

The vesicle accordingly has an interior that is typically defined by a polar liquid. A suitable liquid may be a polar liquid, such as a polar protic liquid. A protic liquid, e.g. solvent, is a liquid that has, for example, a hydrogen atom bound to an oxygen as in a hydroxyl group or a nitrogen as in an amine group. More generally, any molecular liquid which contains dissociable $H^+$, such as hydrogen fluoride, is called a protic liquid. The molecules of such liquid can donate an $H^+$ (proton). Examples for polar protic liquid may be, but are not limited to, water, methanol, ethanol or acetic acid. In one embodiment of the present invention water may be used.

The interior of the vesicle may in some embodiments include an aqueous solution. Further matter may be included in a respective the aqueous solution, for example dissolved or suspended therein. As an illustrative example an aqueous solution may include one or more buffer compounds. Numerous buffer compounds are used in the art and may be used to carry out the various processes described herein. Examples of buffers include, but are not limited to, solutions of salts of phosphate, carbonate, succinate, carbonate, citrate, acetate, formate, barbiturate, oxalate, lactate, phthalate, maleate, cacodylate, borate, N-(2-acetamido)-2-amino-ethanesulfonate (also called (ACES), N-(2-hydroxyethyl)-piperazine-N'-2-ethanesulfonic acid (also called HEPES), 4-(2-hydroxyethyl)-1-piperazine-propanesulfonic acid (also called HEPPS), piperazine-1,4-bis(2-ethanesulfonic acid) (also called PIPES), (2-[Tris(hydroxymethyl)-methylamino]-1-ethansulfonic acid (also called TES), 2-cyclohexylamino-ethanesulfonic acid (also called CHES) and N-(2-acetamido)-iminodiacetate (also called ADA). Any counter ion may be used in these salts; ammonium, sodium, and potassium may serve as illustrative examples. Further examples of buffers include, but are not limited to, triethanolamine, diethanolamine, ethylamine, triethylamine, glycine, glycylglycine, histidine, tris(hydroxymethyl)aminomethane (also called TRIS), bis-(2-hydroxyethyl)-iminotris(hydroxymethyl)methane (also called BIS-TRIS), and N-[Tris(hydroxymethyl)-methyl]-glycine (also called TRICINE), to name a few. The buffers may be or be included in aqueous solutions of such buffer compounds or solutions in a suitable polar organic solvent. Further examples of matter that may be present, include salts, detergents or chelating compounds. As a further illustrative example an aqueous solution may include one or more compounds, e.g. dyes or fluorescent indicators, that are sensitive to the presence of a certain ion. As an illustrative example, a calcium sensitive fluorescent indicators such as fura-2, fluo-3, indo-1, BCECF, calcein may be included in the interior of the vesicle. As two further examples, a sodium sensitive indicator such as sodium-binding benzofuran isophthalate or corona green, or a potassium sensitive indicator such as potassium-binding benzofuran isophthalate may be included in the interior of the vesicle (cf. also below). A further illustrative example of an indicator that may be included in an aqueous solution is an indicator of redox potential, such as a redox sensitive dye, e.g. hexamethylpararosaniline chloride (crystal violet).

As also explained below, in some embodiments the presence of quantum dots or dyes in the interior of the vesicle may serve or assist in monitoring the integrity of the vesicles. Thereby it is possible to instantaneously monitor whether the vesicle is intact, for example during an in-vitro synthesis process. In some embodiments a pharmaceutically active compound is included in the vesicle. If a channel protein, a transporter protein or a receptor channel is integrated into the membrane of the vesicle, a change in conditions of the ambience of the vesicle may cause the opening of the channel or activation of the transporter and thereby trigger the release of the pharmaceutically active compound. Such an embodiment may for example be used in vivo, such as in embodiments where the system of the invention is transferred into an organism such as a human or animal body.

The interior of the vesicle may also include a sample. Such a sample may be of any origin. It may for instance, but not limited to, be derived from humans, animals, plants, bacteria, viruses, spores, fungi, or protozoae, or from organic or inorganic materials of synthetic or biological origin. Accordingly, any of the following samples selected from, but not limited to, the group consisting of a soil sample, an air sample, an environmental sample, a cell culture sample, a bone marrow sample, a rainfall sample, a fallout sample, a sewage sample, a ground water sample, an abrasion sample, an archaeological sample, a food sample, a blood sample, a serum sample, a plasma sample, an urine sample, a stool sample, a semen sample, a lymphatic fluid sample, a cerebrospinal fluid sample, a nasopharyngeal wash sample, a sputum sample, a mouth swab sample, a throat swab sample, a nasal swab sample, a bronchoalveolar lavage sample, a bronchial secretion sample, a milk sample, an amniotic fluid sample, a biopsy sample, a cancer sample, a tumour sample, a tissue sample, a cell sample, a cell culture sample, a cell lysate sample, a virus culture sample, a nail sample, a hair sample, a skin sample, a forensic sample, an infection sample, a nosocomial infection sample, a production sample, a drug preparation sample, a biological molecule production sample, a protein preparation sample, a lipid preparation sample, a carbohydrate preparation sample, a space sample, an extraterrestrial sample or any combination thereof may be processed in the method. Where desired, a respective sample may have been preprocessed to any degree. As an illustrative example, a tissue sample may have been digested, homogenised or centrifuged prior to being used with the device of the present invention. The sample may furthermore have been prepared in form of a fluid, such as a solution. Examples include, but are not limited to, a solution or a slurry of a nucleotide, a polynucleotide, a nucleic acid, a peptide, a polypeptide, an amino acid, a protein, a synthetic polymer, a biochemical composition, an organic chemical composition, an inorganic chemical composition, a metal, a lipid, a carbohydrate, a combinatory chemistry product, a drug candidate molecule, a drug molecule, a drug metabolite or of any combinations thereof. Further examples include, but are not limited to, a suspension of a metal, a suspension of metal alloy, and a solution of a metal ion or any combination thereof, as well as a suspension of a cell, a virus, a microorganism, a pathogen, a radioactive compound or of any combinations thereof. It is understood that a sample may furthermore include any combination of the aforementioned examples.

The interior of the vesicle and the circumferential membrane define two immiscible phases, an outer phase, the membrane, and an inner phase, the interior of the vesicle. The outer phase is immiscible with the inner phase. Typically, the fluid of the outer phase is immiscible with the fluid of the inner phase (see also above). Often liquids are classified into polar and non-polar liquids in order to characterize properties such as solubility and miscibility with other liquids. Polar liquids typically contain molecules with an uneven distribution of electron density. The polarity of a molecule is reflected by its dielectric constant or its dipole moment. Polar molecules are typically further classified into protic and non-protic (or aprotic) molecules. A fluid, e.g. a liquid, that contains to a large extent polar protic molecules may therefore be termed a polar protic fluid. A fluid, e.g. a liquid, that contains to a large extent polar non-protic molecules may be termed a polar non-protic fluid. Protic molecules contain a hydrogen atom which may be an acidic hydrogen when the molecule is dissolved for instance in water or an alcohol. Aprotic molecules do not contain such hydrogen atoms.

Examples of non-polar liquids include, but are not limited to, hexane, heptane, cyclohexane, benzene, toluene, dichloromethane, carbon tetrachloride, carbon disulfide, dioxane, diethyl ether, or diisopropylether. Examples of dipolar aprotic liquids are methyl ethyl ketone, chloroform, tetrahydrofuran, ethylene glycol monobutyl ether, pyridine, methyl isobutyl ketone, acetone, cyclohexanone, ethyl acetate, isobutyl isobutyrate, ethylene glycol diacetate, dimethylformamide, acetonitrile, N,N-dimethyl acetamide, nitromethane, acetonitrile, N-methylpyrrolidone, methanol, ethanol, propanol, isopropanol, butanol, N,N-diisopropylethylamine, and dimethylsulfoxide. Examples of polar protic liquids are water, methanol, isopropanol, tert.-butyl alcohol, formic acid, hydrochloric acid, sulfuric acid, acetic acid, trifluoroacetic acid, dimethylarsinic acid [$(CH_3)_2AsO(OH)$], acetonitrile, phenol or chlorophenol. Ionic liquids typically have an organic cation and an anion that may be either organic or inorganic. The polarity of ionic liquids (cf. below for examples) is known to be largely determined by the associated anion. While e.g. halides, pseudohalides, $BF_4^-$, methyl sulphate, $NO_3^-$, or $ClO_4^-$ are polar liquids, hexafluorophosphates, $AsF_6^-$, bis(perfluoroalkyl)-imides, and $[C_4F_6SO_3]^-$ are non-polar liquids.

The membrane of the vesicle is defined by one or more amphiphilic polymers. The term amphiphilic refers to a compound that is soluble in both polar and non-polar fluids. It also encompasses multiphase compounds. The amphiphilic properties of the polymer are due to the presence of both polar and non-polar moieties within the same molecule. In this regard the polymer may be of surfactant nature. Accordingly, the polar properties of the polymer are based on a polar moiety. Two examples of such a moiety are a —COOH side group, in particular in the form of a charged COO$^-$ group and an $SO_4H$ group, in particular in the form of an $SO_4^-$ group. Generally, a surfactant molecule includes a polar, typically hydrophilic, headgroup attached to a non-polar, typically hydrocarbon, moiety. Non-polar moieties of a polymer include a hydrocarbon chain that does not carry a functional group.

A polymer included in the circumferential membrane can be a synthetic polymer, a naturally occurring polymer or a combination thereof. As used herein the term "synthetic polymer" refers to polymers that are not found in nature, including polymers that are made from naturally occurring biomaterials. The use of an amphiphilic polymer allows choosing a vesicle of robust nature, i.e. with particularly high stability in terms of storage, resistance to shear forces and mechanical resistance, for instance in a screening assay. Polymer vesicles such as block copolymer vesicles (also termed 'polymersomes') have superior mechanical and physical properties compared to lipid-based vesicles (also termed liposomes). Polymer vesicles can for instance typically be exposed to one magnitude higher critical areal strain before rupture compared to lipid vesicles. Thereby high stability of membrane proteins incorporated can be provided against mechanical, chemical and microbial attacks. This allows a process-compatibility needed for industrial applications. Such immobilized vesicles can be easily stored and transported; this option is not available for natural membrane structures because of their fragile nature. This will enable industrial production of the immobilized vesicle (polymersome) and enable applications that use membrane based sensing.

The membrane of a vesicle of the invention may include a plurality of amphiphilic polymers, including a plurality of block copolymers. An amphiphilic polymer included in the membrane of the vesicle may for example include a monomer unit of a carboxylic acid, an amide, an amine, an alkylene, a dialkylsiloxane, an ether and an alkylene sulphide. In some embodiments it may include or be a polycarboxylic acid, a polyamide, a polyamine, a polyalkylene, a poly(dialkylsiloxane), a polyether, a poly(alkylene sulphide) and any combination thereof. In some embodiments the amphiphilic polymer is a block copolymer. Any of the afore mentioned examples of polymers may also define a block in a respective block copolymer. A variety of amphiphilic block copolymers is for example known in the art that undergo self-assembly in aqueous solution, thereby minimizing energetically unfavourable hydrophobe-water interactions. Some of these polymers are stimulus-responsive block copolymers. Any of these polymers can be used to define a circumferential membrane of an immobilized vesicle in a system according to the invention. It is noted in this regard that also amphiphilic homopolymers are known in the art that can undergo self-assembly into stable vesicles.

The amphiphilic polymer may for example be a diblock (A-B) or a triblock copolymer (A-B-A or A-B-C). In some embodiments the amphiphilic polymer includes a polyether block such as an oligo(oxyethylene) block, a poly(oxyethylene) block, an oligo(oxypropylene) block, a poly(oxypropylene) block, an oligo(oxybutylene) block and a poly(oxybutylene) block. Further examples of blocks that may be included in the polymer include, but are not limited to, poly(acrylic acid), poly(methyl acrylate), polystyrene, poly(butadiene), poly(2-methyloxazoline), poly(dimethyl siloxane), poly(e-caprolactone), poly(propylene sulphide), poly(N-isopropylacrylamide), poly(2-vinylpyridine), poly(2-(diethylamino)ethyl methacrylate), poly(2-(diisopropylamino)ethylmethacrylate), poly(2-(methacryloyloxy)ethylphosphorylcholine) and poly(lactic acid). Examples of a suitable amphiphilic polymer include, but are not limited to, poly(ethyl ethylene)-b-poly(ethylene oxide) (PEE-b-PEO), poly(butadiene)-b-poly(ethylene oxide) (PBD-b-PEO), poly(styrene)-b-poly(acrylic acid) (PS-PAA), poly(2-methyloxazoline)-b-poly(dimethylsiloxane)-b-poly(2-methyloxazoline) (PMOXA-b-PDMS-b-PMOXA), poly(2-methyloxazoline)-b-poly(dimethyl-siloxane)-b-poly(ethylene oxide) (PMOXA-b-PDMS-b-PEO), poly(ethylene oxide)-b-poly(propylene sulfide)-b-poly(ethylene oxide) (PEO-b-PPS-b-PEO) and a poly(ethylene oxide)-poly(buylene oxide) block copolymer. A block copolymer can be further specified by the average block length of the respective blocks included in a copolymer. Thus $PB_MPEO_N$ indicates the presence of polybutadiene blocks (PB) with a length of M and polyethyleneoxide (PEO) blocks with a length of N. M and N are independently selected integers, which may for example be selected in the range from about 6 to about 60. Thus $PB_{35}PEO_{18}$ indicates the presence of polybutadiene blocks with an average length of 35 and of polyethyleneoxide blocks with an average length of 18. Likewise, $PB_{10}PEO_{24}$ indicates the presence of polybutadiene blocks with an average length of 10 and of polyethyleneoxide blocks with an average length of 24. As a further example $E_OB_P$ indicates the presence of ethylene blocks (E) with a length of. O and butylene blocks (B) with a length of P. O and P are independently selected integers, e.g. in the range from about 10 to about 120. Thus $E_{16}B_{22}$ indicates the presence of ethylene blocks with an average length of 16 and of butylene blocks with an average length of 22.

Depending on the polymer used the membrane may assemble into various vesicle morphologies. Where block copolymers are included in the membrane, segregation of block copolymers may occur. In any such morphology non-polar and thus hydrophobic portions of polymer molecules are typically located within the membrane rather than at the face thereof; they may bridge the membrane. Polar portions of the polymer may be arranged at the interface with the medium in which the vesicle is included, e.g. an aqueous medium. AB diblock copolymers can for example form an interdigitated symmetric membrane. A binary mixture of AB and BC diblock copolymers can result in a morphology of at least partially spatial segregation of AB and BC blocks within the membrane. Likewise, ABC triblock copolymers can form a morphology of at least partially spatial segregation.

A suitable polyether may for example include one of an oligo(oxyethylene) block or segment, a poly(oxyethylene) block (or segment), an oligo(oxypropylene) block, a poly (oxypropylene) block, an oligo(oxybutylene) block and a poly(oxybutylene) block. An illustrative example of a respective triblock copolymer is a poloaxamer. A poloaxamer is a difunctional block copolymer surfactant terminating in primary hydroxy groups. It typically has a central non-polar chain, for example of polyoxypropylene(poly (propylene oxide)), flanked by two hydrophilic chains of e.g. polyoxyethylene(poly(ethylene oxide)). The polyether may thus in some embodiments be a poly(ethylene oxide)-poly (propylene oxide)-poly(ethylene oxide) (PEO-PPO-PEO) triblock copolymer. The lengths of the polymer blocks can be customized, so that a large variety of different poloxamers with slightly different properties is commercially available. For the generic term "poloxamer", these copolymers are commonly named with the letter "P" (for poloxamer) followed by three digits, the first two digits×100 give the approximate molecular mass of the polyoxypropylene core, and the last digit×10 gives the percentage polyoxyethylene content (e.g., P407=Poloxamer with a polyoxypropylene molecular mass of 4,000 g/mol and a 70% polyoxyethylene content). For the Pluronic tradename, coding of these copolymers starts with a letter to define it's physical form at room temperature (L=liquid, P=paste, F=flake (solid)) followed by two or three digits, the first digit(s) refer to the molecular mass of the polyoxypropylene core (determined from BASF's Pluronic grid) and the last digit×10 gives the percentage polyoxyethylene content (e.g., F127=Pluronic with a polyoxypropylene molecular mass of 4,000 g/mol and a 70% polyoxyethylene content). The polyether may for example be a triblock copolymer of oxirane with 2-methyl-oxirane, having the Chemical Abstract No. 691397-13-4.

Illustrative examples of such a polyether are the commercially available triblock copolymers Adeka Pluronic F 68, Nissan Plonon 104, Novanik 600/50, Lutrol 127, Pluriol PE 1600, Plonon 104, Plonon 407, Pluronic 103, Pluronic 123, Pluronic 127, Pluronic A 3, Pluronic F-127, Pluronic F 168, Pluronic 17R2, Pluronic P 38, Pluronic P 75, Pluronic PE 103, Pluronic L 45, Pluronic SF 68, Slovanik 310, Synperonic P 94 or Synperonic PE-F 127, to name a few.

The amphiphilic polymer included in the circumferential membrane of the vesicle may in some embodiments have a glass transition (Tg) temperature at standard atmospheric pressure that is below ambient temperature, e.g. below about 22° C. If the temperature of a polymer is decreased, the glass transition temperature corresponds to the temperature at which amorphous domains of a polymer take glass style characteristics in terms of rigidity, stiffness and rigidity. The glass transition temperature may for example be selected below about 0° C., such as below about −40° C., e.g. below about −60° C., below about −80° C. or below about −90° C., such as for instance about −93° C., about −100° C., about −125° C. or about −130° C.

In some embodiments a polymer included in the circumferential membrane of the vesicle is biocompatible, including pharmaceutically acceptable. An illustrative example of a respective block is poly(D,L-lactide-co-glycolide), for example included in the polymer pluronic-Poly(D,L-lactide-co-glycolide). The term "biocompatible" (which also can be referred to as "tissue compatible"), as used herein, is a polymer or polymer block that produces little if any adverse biological response when used in vivo. The term thus generally refers to the inability of such a block or polymer to promote a measurably adverse biological response in a cell, including in the body of an animal, including a human. A biocompatible polymer block or polymer can have one or more of the following properties: non-toxic, non-mutagenic, non-allergenic, non-carcinogenic, and/or non-irritating. A biocompatible polymer block or polymer, in the least, can be innocuous and tolerated by the respective cell and/or body. A biocompatible polymer block or polymer, by itself, may also improve one or more functions in the body.

Examples of suitable biocompatible polymer blocks include non-absorbable polymer blocks such as polypropylene, polyethylene, poly(ethylene terephthalate), poly(butylene terephthalate), polytetrafluoroethylene, polyaryletherketone, nylon, fluorinated ethylene propylene, polybutester, and silicone; absorbable polymer blocks such as polyglycolic acid (PGA), polylactic acid (PLA), polycaprolactone, and polyhydroxyalkanoate.

Via a molecule with a non-polar aliphatic, alicyclic, aromatic or arylaliphatic moiety the vesicle is coupled to the surface. The term "aliphatic" means, unless otherwise stated, a straight or branched hydrocarbon chain, which may be saturated or mono- or poly-unsaturated and include heteroatoms. The term "heteroatom" as used herein means an atom of any element other than carbon or hydrogen. An unsaturated aliphatic group contains one or more double and/or triple bonds (alkenyl or alkinyl moieties). The branches of the hydrocarbon chain may include linear chains as well as non-aromatic cyclic elements. The hydrocarbon chain, which may, unless otherwise stated, be of any length, and contain any number of branches. Typically, the hydrocarbon (main) chain includes 1 to 5, to 10, to 15 or to 20 carbon atoms. Examples of alkenyl radicals are straight-chain or branched hydrocarbon radicals which contain one or more double bonds. Alkenyl radicals generally contain about two to about twenty carbon atoms and one or more, for instance two, double bonds, such as about two to about ten carbon atoms, and one double bond. Alkynyl radicals normally contain about two to about twenty carbon atoms and one or more, for example two, triple bonds, preferably such as two to ten carbon atoms, and one triple bond. Examples of alkynyl radicals are straight-chain or branched hydrocarbon radicals which contain one or more triple bonds. Examples of alkyl groups are methyl, ethyl, propyl, butyl, pentyl, hexyl, heptyl, octyl, nonyl, decyl, the n isomers of these radicals, isopropyl, isobutyl, isopentyl, sec-butyl, tert-butyl, neopentyl, 3,3 dimethylbutyl. Both the main chain as well as the branches may furthermore contain heteroatoms, i.e. atoms that differ from carbon and hydrogen, as for instance N, O, S, Se or Si or carbon atoms may be replaced by these heteroatoms. Where several heteroatoms are present within a moiety of a reactant or product of the process of the invention, they are independently selected.

The term "alicyclic" may also be referred to as "cycloaliphatic" and means, unless stated otherwise, a non-aromatic cyclic moiety (e.g. hydrocarbon moiety), which may be saturated or mono-or poly-unsaturated. The cyclic hydrocarbon moiety may also include fused cyclic ring systems such as decalin and may also be substituted with non-aromatic cyclic as well as chain elements. The main chain of the cyclic hydrocarbon moiety may, unless otherwise stated, be of any length and contain any number of non-aromatic cyclic and chain elements. Typically, the hydrocarbon (main) chain includes 3, 4, 5, 6, 7 or 8 main chain atoms in one cycle. Examples of such moieties include, but are not limited to, cyclopentyl, cyclohexyl, cycloheptyl, or cyclooctyl. Both the cyclic hydrocarbon moiety and, if present, any cyclic and chain substituents may furthermore contain heteroatoms, as for instance N, O, S, Se or Si, or a carbon atom may be replaced by these heteroatoms. The term "alicyclic" also includes cycloalkenyl moieties that are unsaturated cyclic hydrocarbons, which generally contain about three to about eight ring carbon atoms, for example five or six ring carbon atoms. Cycloalkenyl radicals typically have a double bond in the respective ring system. Cycloalkenyl radicals may in turn be substituted.

In contrast thereto, the term "aromatic" means an at least essentially planar cyclic hydrocarbon moiety of conjugated double bonds, which may be a single ring or include multiple condensed (fused) or covalently linked rings, for example, 2, 3 or 4 fused rings. The term aromatic also includes alkylaryl. Typically, the hydrocarbon (main) chain includes 5, 6, 7 or 8 main chain atoms in one cycle. Examples of such moieties include, but are not limited to, cyclopentadienyl, phenyl, napthalenyl-, [10]annulenyl-(1,3,5,7,9-cyclodecapentaenyl-), [12]annulenyl-, [8]annulenyl-, phenalene(perinaphthene), 1,9-dihydropyrene, chrysene (1,2-benzophenanthrene). An example of an alkylaryl moiety is benzyl. The main chain of the cyclic hydrocarbon moiety may, unless otherwise stated, be of any length and contain any number of heteroatoms, as for instance N, O and S. Such a heteroaromatic moietie may for example be a 5- to 7-membered unsaturated heterocycle which has one or more heteroatoms from the series O, N, S. Examples of such heteroaromatic moieties (which are known to the person skilled in the art) include, but are not limited to, furanyl-, thiophenyl-, naphtyl-, naphthofuranyl-, anthrathiophenyl-, pyridinyl-, pyrrolyl-, quinolinyl, naphthoquinolinyl-, quinoxalinyl-, indolyl-, benzindolyl-, imidazolyl-, oxazolyl-, oxoninyl-, oxepinyl-, benzoxepinyl-, azepinyl-, thiepinyl-, selenepinyl-, thioninyl-, azecinyl-, (azacyclodecapentaenyl-), diazecinyl-, azacyclododeca-1,3,5,7,9,11-hexaene-5,9-diyl-, azozinyl-, diazocinyl-, benzazocinyl-, azecinyl-, azaundecinyl-, thia[11]annulenyl-, oxacyclotrideca-2,4,6,8,10,12-hexaenyl- or triaza-anthracenyl-moieties.

By the term "arylaliphatic" is meant a hydrocarbon moiety, in which one or more aromatic moieties are substituted with one or more aliphatic groups. Thus the term "arylaliphatic" also includes hydrocarbon moieties, in which two or more aryl groups are connected via one or more aliphatic chain or chains of any length, for instance a methylene group. Typically, the hydrocarbon (main) chain includes 5, 6, 7 or 8 main chain atoms in each ring of the aromatic moiety. Examples of arylaliphatic moieties include, but are not limited to, 1-ethyl-naphthalene, 1,1'-methylenebis-benzene, 9-isopropylanthracene, 1,2,3-trimethyl-ben-zene, 4-phenyl-2-buten-1-ol, 7-chloro-3-(1-methylethyl)-quinoline, 3-heptyl-furan, 6-[2-(2,5-diethylphenyl)-ethyl]-4-ethyl-quinazoline or, 7,8-dibutyl-5,6-diethyl-isoquinoline.

Each of the terms "aliphatic", "alicyclic", "aromatic" and "arylaliphatic" as used herein is meant to include both substituted and unsubstituted forms of the respective moiety. An aliphatic moiety may be substituted or unsubstituted with one or more functional groups. Substituents may be any functional group, as for example, but not limited to, —COOH (carboxy), —OH (hydroxy), —SH (thiol-), a dithiane-, —SeH (seleno-), —CHO (aldehyde), —CO— (carbonyl), —OSO— (sulfonyl), sulfo-, sulfido-, —O— (oxo), sulfate (—OSO$_3$H), —NH$_2$ (amino), —NO (nitro), —NS, —NSe, a halogen such as —Br (bromo), —Cl (chloro) or —F (fluoro), an amino-, an imino-, an amido-, an imido-, an azido-, a diazo-, a cyano-, an isocyano-, a thiocyano-, a nitro-, a nitroso-, a sulfonyl- (e.g. a trifluoromethyl sulfonyl-, p-toluenesulfonyl-, bromobenzenesulfonyl-, nitrobenzenesulfonyl-, or a methane-sulfonyl), silyl-, silano- or a siloxy-group.

The non-polar aliphatic, alicyclic, aromatic or arylaliphatic moiety of the respective molecule may have a main chain that is linear or branched. The main chain of this non-polar moiety has a main chain of 2 to about 30 carbon atoms, such as 3 to about 30, 4 to about 30, 5 to about 30, 3 to about 25, 4 to about 25, 3 to about 20, 4 to about 20, 3 to about 18, 3 to about 15 or 3 to about 10, e.g. 2, 3, 4, 5, 6, 7, 8, 9, 10, 11, 12, 13, 14, 15, 16, 17 or 18 carbon atoms. The main chain of the non-polar moiety may further include one or more heteroatoms such as Si, O, S or Se. It may for example include 0 to about 16 heteroatoms, such as 0 to about 14, 0 to about 12, 0 to about 10, 0 to about 7, 0 to about 5 or 0 to about 3 heteroatoms, such as e.g. 1, 2, 3, 4, 5, 6, 7, 8, 9, 10, 11, 12, 13, 14, 15, or 16 heteroatoms.

The non-polar aliphatic, alicyclic, aromatic or arylaliphatic moiety may be any respective moiety that is included in any desired molecule (cf. also below). As an illustrative example, it may be a non-polar aliphatic portion of a lipid such as dimyristoylphosphatidyl-ethanolamine, of a thio-lipid such as 2,3-di-O-phytanyl-sn-glycerol-1-tetraethylene glycol-D,L-R-lipoic acid ester lipid, cholesterol or sphingomyelin.

The molecule with the non-polar aliphatic, alicyclic, aromatic or arylaliphatic moiety couples the vesicle to the surface. In some embodiments the molecule with the non-polar aliphatic, alicyclic, aromatic or arylaliphatic moiety is coupled to the surface via further matter such as a further molecule, including a polymer. In some embodiments the molecule with the non-polar aliphatic, alicyclic, aromatic or arylaliphatic moiety is fixed to the surface via non-covalent or covalent interaction. Such interaction may be, but is not limited to, a coordinative bond, a Casimir interaction, a hydrophobic interaction, hydrogen bonding, a solvation force and a Van-der-Waals interaction.

The molecule with the non-polar aliphatic, alicyclic, aromatic or arylaliphatic moiety may also be covalently attached to the surface. As a further illustrative example, a linking moiety such as an affinity tag may be used to immobilise the respective molecule. Such a linking moiety may be a molecule, e.g. a hydrocarbon-based (including polymeric) molecule that includes nitrogen-, phosphorus-, sulphur-, carben-, halogen- or pseudohalogen groups, or a portion thereof. As an illustrative example, the selected surface may include, for instance be coated with, a brush-like polymer, for example with short side chains. The immobilisation surface may also include a polymer that includes a brush-like structure, for example by way of grafting. It may for example include functional groups that allow for the covalent attachment of a molecule. Examples of a respective functional group include, but are not limited to, an amino group, an aldehyde group, a thiol group, a carboxyl group, an ester, an anhydride, a sulphonate, a sulphonate ester, an imido ester, a silyl halide, an epoxide, an aziridine, a phosphoramidite and a diazoalkane.

In some embodiments the molecule with the non-polar moiety is coupled to the surface via further matter which is connected to the surface. The molecule may for example be included in a hydrogel, i.e. a polymer network in which water is the dispersion medium. Such a hydrogel may be attached or connected to the surface. It may for instance be attached to the surface via non-covalent or covalent interaction. As explained above, examples of such interaction include, but are not limited to, a coordinative bond, a Casimir interaction, a hydrophobic interaction, hydrogen bonding, a solvation force and a Van-der-Waals interaction. The molecule with the non-polar moiety may have a first portion and a second portion. The first portion may be integrated in the circumferential membrane of the immobilized vesicle. The non-polar aliphatic, alicyclic, aromatic or arylaliphatic moiety may include this first portion. In some embodiments the non-polar moiety corresponds to the respective first portion. Accordingly, in such an embodiment the entire non-polar moiety is integrated into the circumferential membrane of the immobilized vesicle. In some embodiments the first portion (of the molecule with the non-polar aliphatic) is defined entirely by a portion of the non-polar aliphatic, alicyclic, aromatic or arylaliphatic moiety. A residual portion of the non-polar aliphatic, alicyclic, aromatic or arylaliphatic moiety may, however, not be integrated into the circumferential membrane of the vesicle. This residual portion of the non-polar moiety may for example be included in the second portion of the respective molecule. It may also be included in yet a further portion thereof, which may be taken to be a third portion of the molecule with the non-polar moiety. In some embodiments a gel of a copolymer of octadecyl-acryamide and N,N-dimethyl-acrylamide may be used as described by Hara et al. (Materials Science and Engineering C (2000) 13, 117-121).

In some embodiments such further matter, e.g. a hydrogel, to which the molecule with the non-polar aliphatic, alicyclic, aromatic or arylaliphatic moiety is coupled or in which it is included is immobilized on a wall of a recess of a surface (supra), for example a surface of a plastic material, a metal or a metalloid. As an illustrative example, a hydrogel may cover a portion of a recess, such as a circumferential wall of a well of a multi-well plate. The hydrogel may partly take the space defined by the recess. Thereby a recess may be defined that is partly or entirely defined by a circumferential wall of a hydrogel, into which for instance fluid, e.g. a liquid can be filled.

The second portion of the molecule with the non-polar aliphatic, alicyclic, aromatic or arylaliphatic moiety may in such embodiments be included in the hydrogel. This portion may be of comparable polarity or structurally resemble the hydrogel. The second portion of the molecule with the non-polar aliphatic, alicyclic, aromatic or arylaliphatic moiety may be of a polarity that allows non-covalent interactions, such as hydrophobic interactions, ionic interactions or hydrogen bonding to couple the polymer of the hydrogel and the molecule with the non-polar aliphatic, alicyclic, aromatic or arylaliphatic moiety. In some embodiments the molecule with the non-polar aliphatic, alicyclic, aromatic or arylaliphatic moiety is included in the hydrogel. It may for example be included in the polymer that defines the hydrogel. In some embodiments the molecule with the non-polar moiety is a polymer that defines a hydrogel, and the non-polar aliphatic, alicyclic, aromatic or arylaliphatic moiety may be a side chain thereof. This side chain, or a portion of this side chain, may be integrated into the circumferential membrane of the vesicle.

The residual portion of the molecule with the non-polar aliphatic, alicyclic, aromatic or arylaliphatic moiety, i.e. the further portion besides the non-polar moiety, may include any desired chemical entities. In some embodiments this residual portion is or includes a portion of, one of a peptide (e.g. a thiopeptide) including e.g melittin and gramicidin, a protein, PEG, a sugar moiety, a silane moiety, a silane/thiol moiety, a polymer moiety such as poly ethyleneimine, a poly(ethyleneoxid) moiety or a poly ethyloxazoline-stat-ethyleneimine polymer moiety or a lipd. A peptide portion may for instance be taken to define a hydrophilic spacer molecule for tethering a lipid membrane or a membrane of an amphiphilic polymer. A suitable peptide moiety may for instance have a length of about 3 to about 100, such as about 4 to about 30, such as about 5 to about 25 or to about 15 to about 20 amino acids. Such a peptide moiety may include a cysteine residue, for instance at its end. When using a gold surface, self-assembly caused by strong gold-sulfur interaction of a cysteine within such a peptide moiety can occur. As an illustrative example, a peptide moiety may be or include the 19-mer peptide CSRARKQAASIKVAVSADR of the α-laminin subunit. An overview on suitable molecules or molecule moieties that can act as a spacer between a surface and a lipid membrane has for instance been given by Sinner et al. (ADVANCES IN CLINICAL CHEMISTRY (2009) 49, 159-179). These examples are equally suited for a membrane of an amphiphilic polymer used in the present invention. Another suitable polymer that is amphilic, meaning that has a polar moiety and a non-polar moiety (wherein the latter can be used as anchor), that can be used in the present invention is poly-ethyloxazoline-stat-ethyleneimine as described in Knoll et al. Reviews in Molecular Biotechnology 74, (2000), 137-158, for example.

As indicated above, in case of a gold surface a thiol group can provide a stable linkage if included in a molecule that couples a vesicle to a surface. In embodiments where the surface is of or includes a metal oxide such as $SiO_2$, $Ta_2O_5$ and $TiO_2$, an oxide silane may for instance be used to provide a stable linkage.

A portion of the non-polar aliphatic, alicyclic, aromatic or arylaliphatic moiety of the molecule via which the vesicle is coupled to the surface is included in the circumferential membrane of the vesicle. Accordingly, a portion of this non-polar aliphatic, alicyclic, aromatic or arylaliphatic moiety is coupled to a non-polar portion of the lipid or of the amphiphilic polymer via non-covalent interactions. These interactions are typically hydrophobic interactions and may include a solvation force and a Van-der-Waals interaction as well as a Casimir interaction. As long as the vesicle, as well as the respective portion of the non-polar moiety of the molecule that couples the vesicle to the surface, is included in a polar solvent, in particular in an aqueous medium, this non-covalent interaction will generally remain intact.

The vesicle may be immobilized—that is: coupled to the surface—after the vesicle has been formed. Preparing an immobilized vesicle according to the invention may accordingly include providing a vesicle that has a circumferential membrane of a lipid or of an amphiphilic polymer. As explained above, the vesicle is coupled to the surface by means of a molecule that is in turn coupled to the surface. This molecule, which has a non-polar moiety, is coupled to the surface in the presence of the vesicle. Coupling the molecule to the surface may expose the non-polar moiety of the molecule. Due to its hydrophobicity the non-polar moiety has a tendency to integrate into the circumferential membrane of the vesicle, in particular where the coupling is carried out in a polar solvent. In some embodiments where the molecule with the non-polar moiety is to be integrated into other matter such as a hydrogel, such other matter, e.g. the hydrogel, may be formed in situ, for example on the surface. Accordingly, in some embodiments the vesicle may be coupled to the surface while the molecule with the non-polar moiety is being coupled to the surface. In some embodiments the vesicle may be coupled to the surface after the molecule with the non-polar moiety has been coupled to the surface.

In some embodiments the system of the invention includes a surface with a plurality of vesicles immobilized thereon. Each of the vesicles immobilized on the surface may have a circumferential membrane of the same amphiphilic polymer. The same or different molecules may be used to tether the vesicles to the surface. In some embodiments each vesicle of a plurality of vesicles is coupled, including attached, to the surface by means of a molecule with a non-polar moiety that is of identical structure as the respective molecule of an, including any, other molecule by means of which another vesicle is coupled to the surface. In some embodiments a molecule of identical structure couples each vesicle of a plurality of vesicles to the surface. Where a plurality of vesicles is immobilized on the surface, the vesicles may be arranged in any desired order or pattern. They may be randomly distributed across the entire surface or only be arranged on one or more portions thereof Vesicles of a plurality of vesicles may have the same, at least essentially identical, similar or different dimensions and widths of their membrane.

In some embodiments one or more monomers are provided that are capable of forming a hydrogel. A hydrogel may be allowed to form from the one or more monomers. Forming a hydrogel from the one or more monomers may be taken to be included in coupling the molecule with the non-polar moiety to the surface in the presence of the vesicle. As a result of the formation of the hydrogel, a first portion of the molecule with the non-polar aliphatic, alicyclic, aromatic or arylaliphatic moiety may be integrated into the circumferential membrane of the immobilized vesicle and a second portion may be included into the hydrogel (supra). As explained above, the non-polar aliphatic, alicyclic, aromatic or arylaliphatic moiety may include the portion of the molecule integrated into the circumferential membrane of the immobilized vesicle.

In some embodiments a membrane protein is associated with, including integrated into, the circumferential membrane of the vesicle. The membrane protein associated with/integrated into the circumferential membrane of the vesicle may be any membrane protein. It may be a peripheral membrane protein or an integral membrane protein. It may in some embodiments have one or more domains that span the membrane. Examples of a suitable membrane protein with a transmembrane domain include, but are not limited to, a G-protein coupled receptor, such as an odorant receptors, a rhodopsin receptor, a rhodopsin pheromone receptor, a peptide hormone receptors, a taste receptor, a GABA receptor, an opiate receptor, a serotonin receptor, a $Ca^{2+}$ receptor, melanopsin, a neurotransmitter receptor, such as a ligand gated, a voltage gated or a mechanically gated receptor, including the acetylcholine, the nicotinic, the adrenergic, the norepinephrine, the catecholamines, the L-DOPA-, a dopamine and serotonin (biogenic amine, endorphin/enkephalin) neuropeptide receptor, a ionotropic receptor such as a glutamate receptor, a receptor kinase such as serin/threonin kinase, a tyrosine kinase, a porin/channel such as a chloride channel, a potassium channel, a sodium channel, an OMP protein, an ABC transporter (ATP-Binding Cassette—Transporter) such as amino acid transporter, the Na-glucose transporter, the $Na^+$/iodide transporter, an ion transporters such as cytochrome c oxidase, ATPase Na/K, H/K, Ca, a cell adhesion receptor such as metallo protease, an integrin or a catherin.

The membrane protein may be associated, including—where applicable—integrated into the circumferential membrane by means of a cell-free expression system. Such a cell-free expression system allows a nucleic acid encoding the selected membrane protein to be transcribed and translated. Thereby the selected membrane protein is formed in situ and immediately incorporated into the circumferential membrane. Such a cell-free expression system is typically an in vitro transcription and translation system. In some embodiments an eukaryotic cell-free extract is used as an expression system. Suitable expression systems are commercially available, e.g. as TNT® coupled transcription/translation system by Promega. In some embodiments a prokaryotic cell-free expression system (e.g. RTS 100 *E. coli* by kit™ by Roche Applied Science) or an archaic cell-free expression system is used.

The term "nucleic acid molecule" as used herein refers to any nucleic acid in any possible configuration, such as single stranded, double stranded or a combination thereof. Nucleic acids include for instance DNA molecules, RNA molecules, analogues of the DNA or RNA generated using nucleotide analogues or using nucleic acid chemistry, locked nucleic acid molecules (LNA), PNA molecules (supra) and tecto-RNA molecules (e.g. Liu, B., et al., *J. Am. Chem. Soc.* (2004) 126, 4076-4077). A PNA molecule is a synthetic nucleic acid analogue with a pseudopeptide backbone in which the phosphodiester backbone present in e.g. DNA or RNA is replaced by repetitive units of short aliphatic moieties with an amino end and a carboxylic end, forming an amide bond in the oligomer or polymer. An LNA molecule has a modified RNA backbone with a methylene bridge between C4' and O2', which locks the furanose ring in a N-type configuration, providing the respective molecule with a higher duplex stability and nuclease resistance. Unlike a PNA molecule an LNA molecule has a charged backbone. DNA or RNA may be of genomic or synthetic origin and may be single or double stranded. Such nucleic acid can be e.g. mRNA, cRNA, synthetic RNA, genomic DNA, cDNA synthetic DNA, a copolymer of DNA and RNA, oligonucleotides, etc. A respective nucleic acid may furthermore contain non-natural nucleotide analogues and/or be linked to an affinity tag or a label.

The association of a membrane protein with the circumferential membrane, including its integration/incorporation therein, can be monitored using any suitable detection method available in the art. As an illustrative example, it may be monitored in real-time by surface plasmon resonance spectroscopy, which may be applied in combination with surface plasmon enhanced fluorescence spectroscopy (for an overview see e.g. Wiltschi, B, et al., Methods 39 (2006) 134-146).

In some embodiments a membrane protein is associated with/integrated into the circumferential membrane of the vesicle that is intended to be subject to an assay or a screening method. As an example, it may be desired to identify a compound that is capable of modulating, such as stimulating or inhibiting, including blocking, a membrane protein. The respective membrane protein, which may be any membrane protein, may be expressed and associated with/integrated into a circumferential membrane of an immobilized vesicle according to the invention. Where a measurable effect of the membrane protein, e.g. a cellular response, is known the required components to achieve such a response may be integrated into the vesicle. In embodiments where the membrane protein is responsive to external molecules, it may be termed a receptor protein. A respective molecule from the ambience may form a complex with the receptor protein. Thereby the receptor protein may undergo a change, such as a conformational change, from an active state to an inactive state and vice versa. As a first step it may be desired to identify a compound that is able to form a complex with such a receptor protein. Once such a complex is identified a cellular effect may be analysed, for example by expressing an effector protein and integrating the same into the vesicle. A stimulation or inhibition of the effector protein may then be determined.

The architecture of the invention, using immobilized vesicles, provides a larger surface area to which membrane proteins can be associated, when compared to a two-dimensional system (as in e.g. WO 2007/048459). This is for instance of importance in optimizing the signal to noise ratio of sensing applications and is of potential interest for structure-resolution approaches, based on Infrared technologies.

An immobilized vesicle with an associated or integrated membrane protein may in some embodiments be used for the in-vitro screening for potential compounds that are useful for modulating the function of the membrane protein, including the simultaneous screening of compound libraries on multiple-well microplates using automated work stations.

In some embodiments it is determined whether the formation of a complex between a candidate compound and a membrane receptor protein occurs. In such an embodiment an immobilized vesicle may be provided which has an associated/integrated membrane receptor protein. The candidate compound is brought in contact with the vesicle and thereby with the membrane receptor protein. The vesicle may for example be provided in aqueous solution to which the candidate compound is added. Further the complex formation is detected. In some embodiments the candidate compound has a label, such as a radioactive label or a photoactive, e.g. a luminescent, label, allowing the detection of a complex after for example a washing step, which is a standard procedure in the art. Further examples of determining the formation of a complex as defined above, may for instance rely on spectroscopic, photochemical, photometric, fluorometric, radiological, enzymatic or thermodynamic means. An example for a spectroscopic detection method is fluorescence correlation spectroscopy (Thompson N L et al, Curr Opin Struct Biol. 12 (5), 2002, 634-641). A photochemical method is for instance photochemical cross-linking (Steen H, Jensen O N, Mass Spectrom Rev. 21 (3), 2002, 163-182). The use of photoactive, fluorescent, radioactive or enzymatic labels respectively (for an overview see: Rippe R A et al., Methods Mol Biol. 160, 2001, 459-479) are examples for photometric, fluorometric, radiological and enzymatic detection methods. An example for a thermodynamic detection method is isothermal titration calorimetry (ITC, for an overview see: Velazquez-Campoy A et al., Methods Mol Biol. 261, 2004, 35-54). Some of these methods may include additional separation techniques such as electrophoresis or HPLC. Examples for the use of a label comprise a compound as a probe or an antibody with an attached enzyme, the reaction catalysed by which leads to a detectable signal. An example of a method using a radioactive label and a separation by electrophoresis is an electrophoretic mobility shift assay.

In some embodiments a respective method may be an in-vitro method of identifying a compound that is capable of modulating the function of a (cellular) receptor protein. The receptor protein is capable of inducing a known cellular response. The method includes providing an immobilized vesicle as described above. The immobilized vesicle includes a membrane protein. This membrane protein is associated to the circumferential membrane of the amphiphilic polymer or the lipid of the immobilized vesicle. The membrane protein is a cellular receptor protein, which is the cellular receptor protein that is capable of inducing the known cellular response. The method includes contacting the immobilized vesicle with a candidate compound. The candidate compound is suspected to modulate the function of the cellular receptor protein. The method also includes detecting the known cellular response.

A respective membrane protein integrated into the circumferential membrane of the vesicle may also be an ion channel, an ion transporter or a ionotropic receptor. It may be determined whether a candidate compound is capable of modulating the function of an ion channel or ion transporter protein. In such an embodiment the vesicle may have in its interior phase an indicator that is sensitive to the presence of the ion, which the ion channel/transporter protein is capable of allowing to pass. In some embodiments the ion channel or transporter is selective for this ion. The immobilized vesicle with the ion channel/transporter protein may be contacted with a candidate compound (supra). The passage of ions into or out of the immobilized vesicle may then be detected, for instance by means of an indicator as mentioned above.

In some embodiments one of the above methods of identifying a (candidate) compound may also include comparing the results of detecting, including measuring, the cellular response. The result may for example be compared to a control measurement. For a respective control measurement a compound may be used that is known not to affect the function of the cellular receptor protein. In typical embodiments an altered cellular response as compared to the control measurement indicates that the candidate compound is capable of modulating the function of the cellular receptor protein.

In embodiments where the function of an ion channel, ion pump, ion transporter or ionotropic receptor is to be analysed, a control experiment may be used to analyse the integrity of an immobilized vesicle used. Leakage of ions across the polymer membrane of the immobilized vesicle may easily be detected by means of an indicator sensitive to ions, including sensitive to the ion for which the respective ion channel, ion pump or ion transporter is specific.

In some embodiments a respective method may be an in-vitro method of identifying a portion, e.g. a domain or an amino acid, of a membrane protein, e.g. a receptor, ion channel or ion transporter protein, that is of particular relevance to the function of the membrane protein. As an illustrative example, mutants of a membrane protein of interest may be compared using the immobilized vesicles under comparable or the same conditions. In some embodiments a plurality of such mutants may be analysed in parallel. The membrane proteins may for example be compared in terms of the capability of carrying out their biological function, e.g. amount of ions allowed to pass, including their sensitivity to conditions of the ambience (e.g. temperature, pH, ion concentration etc.) in carrying out their biological function. In one embodiment a library of membrane proteins, including a library of variants of a single protein, produced by in vitro synthesis, may be examined.

For some embodiments of a method of identifying a candidate compound according to the invention, compounds may be used in form of a library. Examples of such libraries are collections of various small organic molecules, chemically synthesized as model compounds, or nucleic acid molecules containing a large number of sequence variants. A method of identifying a compound according to the invention may be carried out as a screening method, including a high-throughput method. In a respective method a library of compounds may for example be screened to identify candidate compounds capable of complex formation with a membrane protein such as a receptor protein. In embodiments where a plurality of candidate compounds are analysed according to a method of the present invention in order to identify a compound capable of modulating a function of a membrane protein, such an embodiment may typically called a screening process. These candidate compounds may be analysed independent from each other, e.g. concurrently, consecutively or in any way out of phase. In some embodiments any number of steps of analysing a plurality of candidate compounds may for example be carried out automatically—also repeatedly, using for instance commercially available robots. For such purposes any number of automation devices may be employed, for instance an automated read-out system, a pipetting robot, a rinsing robot, or a fully automated screening system. As an illustrative example, the process may be an in-vitro screening process, for example carried out in multiple-well microplates (e.g. conventional 48-, 96-, 384- or 1536 well plates) using one or more automated work stations. Hence, in some embodiments the invention provides a process of high-throughput screening.

An immobilized vesicle according to the invention can in some embodiments serve as a stable alternative for a liposome and can be incorporated into a surface-bound architecture that includes the vesicle anchored onto a supporting matrix via an amphiphlic polymer. This architecture could be used as a biochemical reaction chamber to carry out detailed functional analysis of membrane proteins. In particular, the in vitro insertion of membrane proteins into vesicular/spherical architectures enhances the amount of "active material", such as protein moieties. This allows optimization of the signal-to-noise ratio in sensing applications and is of potential interest for structure-resolution approaches, based on Infrared technologies. Other applications of this architecture include but are not limited to, a bio-chemical sensor based on binding to a specific receptor. As an illustrative example, an odor based sensors may include a plurality of immobilized vesicles that carry a respective odor receptor. A vesicle of the invention may also be immobilized onto a substrate that is to be used in vivo. The vesicle may include in its interior a pharmaceutically active compound that is released upon a certain tissue signal, thereby allowing triggered drug delivery. An architecture based on one or more immobilized vesicles may also be used for food or water quality testing. As a further example, one or more immobilized vesicles may be used in pathogen detection. As a further example, a dye or nanocrystals such as quantum dots may be incorporated within the interior of an immobilized vesicle, thereby for example facilitating detection.

Intrinsic difficulties of phospholipid-based membranes as protein embedding materials previously used in the art (FIG. 1) can be overcome by the use of synthetic materials, such as block-copolymers which are compatible with in vitro synthesized complex membrane proteins. Such vesicular structures that include polymeric material are adaptable to industrial process development and are stable against mechanical, chemical and microbial attacks. In addition, these vesicles can be easily stored and transported.

Additional salient benefits offered by the proposed architecture include but are not limited to the following: 1) A robust platform that is functional in aqueous and gaseous environments, organic solvents, and a variety of environmental conditions such as variations in temperature and microbial attacks. 2) A robust preparation method for building the respective architecture. 3) Compatibility with parallel read-out strategies ranging from electrochemical impedance or current measurements, field effect/CMOS transistor current modulation measurements, optical thickness measurements, frequency modulation measurements using surface acoustic or mechanical vibration devices, and biochemical sensing via antibody binding. 4) Ability to perform high throughput synthesis and sensing of and by using membrane proteins.

Figures 2A, 2B:
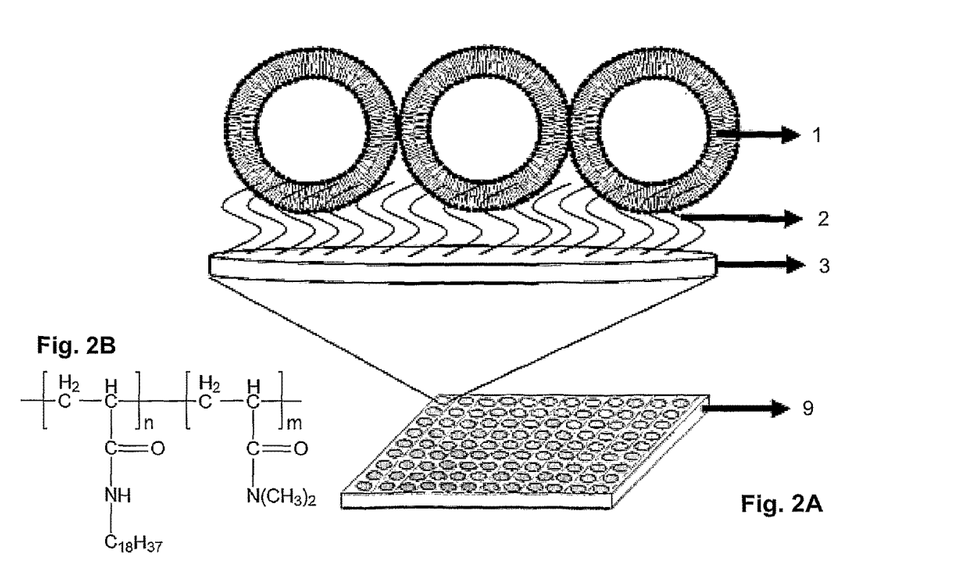
FIG. 2A depicts the schematic representation of a multi-well plate based platform for membrane protein synthesis. The multiwell plate is functionalized with a polyacrylamide matrix with polymer A as an anchor and polymer vesicles are immobilized onto this matrix (1: polymer vesicle; 2: linking moieties; 3: polyacrylamide as supporting matrix; 9: multi-well plate).
FIG. 2B depicts an example of a block copolymer that may be used to form the artificial membrane of the polymer vesicles.

In addition, the invention provides the use of a multiwell plate based platform for membrane protein synthesis. A multiwell plate is functionalized to serve as a matrix and an amphiphilic polymer is attached as an anchor. The polymeric vesicles are anchored onto the matrix as shown in FIG. 2. This architecture incorporates the desirable features of tethered bio-membranes as well as polymer vesicles which may be used as a bio-chemical reaction vessel.

In order that the invention may be readily understood and put into practical effect, particular embodiments will now be described by way of the following non-limiting examples.

EXAMPLES

Example 1

Preparation of Polymer Vesicles

Polybutadiene-Polyethyleneoxide ($PB_{21}$-$PEO_{12}$) diblock copolymer was kindly provided by Prof. Jan van Hest, Radboud University Nijmegen, Netherlands.

10 mg of $PB_{21}$-$PEO_{12}$ di-block copolymer is dissolved in 300 µl of THF and added into 700 µl of MilliQ $H_2O$. The solution is dialyzed using 50,000 MW ready to use membrane (Spectrum Labs) against MilliQ $H_2O$ for 24 hours.

Example 2

Preparation of Anchored Polymer Vesicles on a Multiwell Plate

Octadecylacrylamide and N,N-dimethyl acrylamide with a molar ratio of 99:1 (polymer A) were synthesized according to the procedures of Hara et al. (Supramolecular Science (1998) 5, 777-781). A Microtiter® plate from BD Biosciences was used.

Acrylamide solution (3.5 ml of 50 mM Tri-Cl (pH 7.2), 0.5 ml of 40% acrylamide, 5 µl of N,N,N',N'Tetramethylethylenediamine (TEMED), 35 µl of ammonium persulphate (APS) with and without polymer A is prepared. 100 µl of above solution is added to each well of the Microtiter® plate. 75 µl of polymer vesicles prepared in Example 1 are added into these wells before the acrylamide polymerizes. The Microtiter® plate is shaken gently at room temperature for two hours for even spreading of polymer vesicles on to the Polyacrylamide gel. Microtiter® plate wells were rinsed with MilliQ several times to remove the non-anchored polymer vesicles.

Example 3

Calcein Leakage Assay

Figure 3:
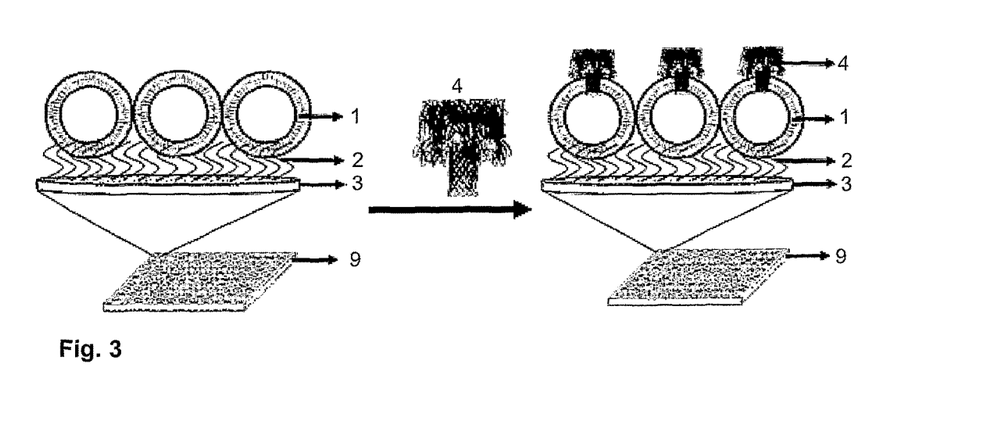
FIG. 3 illustrates as a scheme the insertion of α-hemolysin into polymer vesicles anchored on the multiwell plate (1: polymer vesicle with Calcein; 2: linking moieties; 3: polyacrylamide as supporting matrix; 4: alpha-hemolysin; 9: multiwell plate).

In order to investigate the insertion of membrane proteins into the polymer vesicles embedded on the Microtiter® plate wells, calcein was encapsulated inside the polymer vesicles at self-quenching concentrations. The schematic of this protocol is illustrated in FIG. 3. This calcein based assay provides a quick assay to test the integrity of the spherical structures. A standard calcein based assay can be used to test the integrity of the polymersomes.

30 mM of calcein was encapsulated inside the polymersomes. The solution is dialyzed using 50,000 MW ready to use membrane (Spectrum Labs) against MilliQ $H_2O$ for 24 h to remove the non-encapsulated calcein and to attach the polymersomes to the poly-acrylamide matrix. These polymer vesicles encapsulated with calcein were added to the microtiter plate and shaken gently at room temperature to anchor to the polyacrylamide matrix. After incubation, the microtiter plate was rinsed with MilliQ to remove the non attached polymer vesicles. 20 µl of alpha-hemolysin monomer solution (0.5 mg/ml in NaCl/MOPS buffer), a pore forming protein, was added to the Microtiter® wells containing polymer vesicles with calcein.

Figure 4:
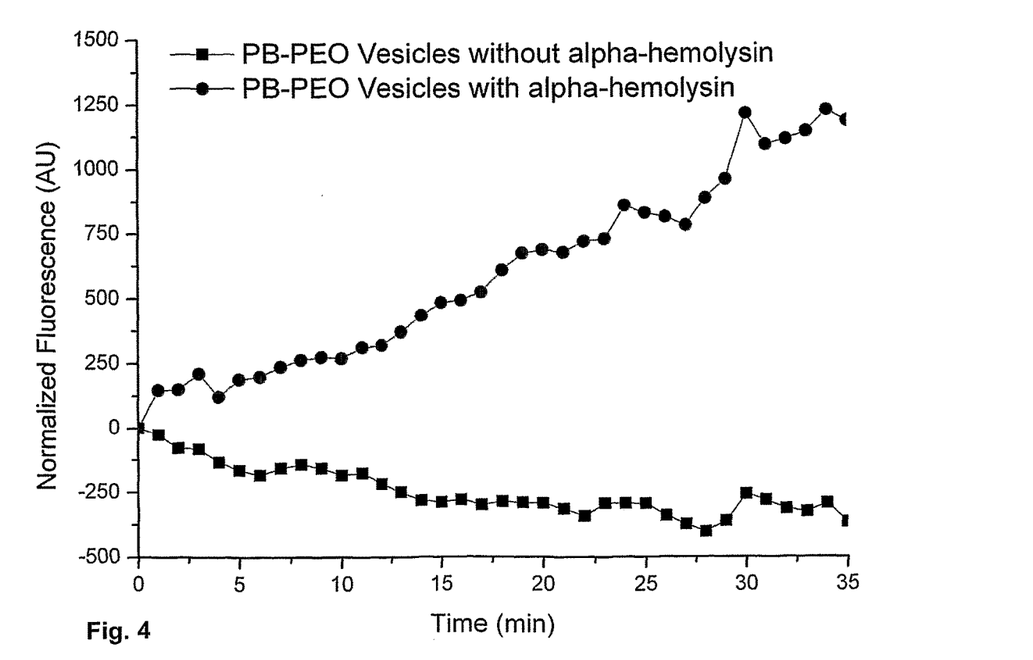
FIG. 4 depicts the increase in fluorescence intensity of calcein due to the dilution from a self-quenching environment (circle). Dilution is due to the diffusion to the exterior of vesicles through a-hemolysin. (square). As a control experiment, addition of MOPS/NaCl buffer does not show any increase in the fluorescence.

Leakage of calcein from the polymer vesicles due to the pore formation in the polymer vesicle membrane was monitored by a Tecan fluorescence plate reader (excitation 495 nm, emission 515 nm). As shown in FIG. 4, addition of α-hemolysin to polymer vesicles cause diffusion of calcein from high concentration (self-quenching) interior to the exterior of polymer vesicles leading to an increasing in fluorescence intensity. A control reaction was carried out by adding (NaCl/MOPS) buffer and no increase fluorescence was demonstrated.

Example 4

In Vitro Synthesis of Membrane Proteins into Block Copolymer Vesicles

As a model membrane protein, odorant receptor 5 protein OR5 protein was studied. For expression of OR5 (cDNA obtained from Max-Planck Institute, Mainz), reactions with 'T7 TNT Quick' in vitro cell-free mixture was prepared as per the supplier's protocol (Robelek 2007). Reaction mixture was added in the micro-titer plate and incubated for 90 min at 30° C. After the reaction, the plate wells were washed thoroughly with PBS. PB-PEO vesicles were prepared and immobilized onto the Microtiter® plate. Three different tests were performed in separate wells: 1) 'T7 TNT Quick coupled' in vitro reaction mixture with cDNA of OR5 added to a well with PB-PEO vesicles; 2) 'T7 TNT Quick coupled' in vitro reaction mixture with cDNA added to a well without PB-PEO vesicles; 3) 'T7 TNT Quick' in vitro reaction mixture without cDNA to a well containing polymer vesicles.

Figure 5:
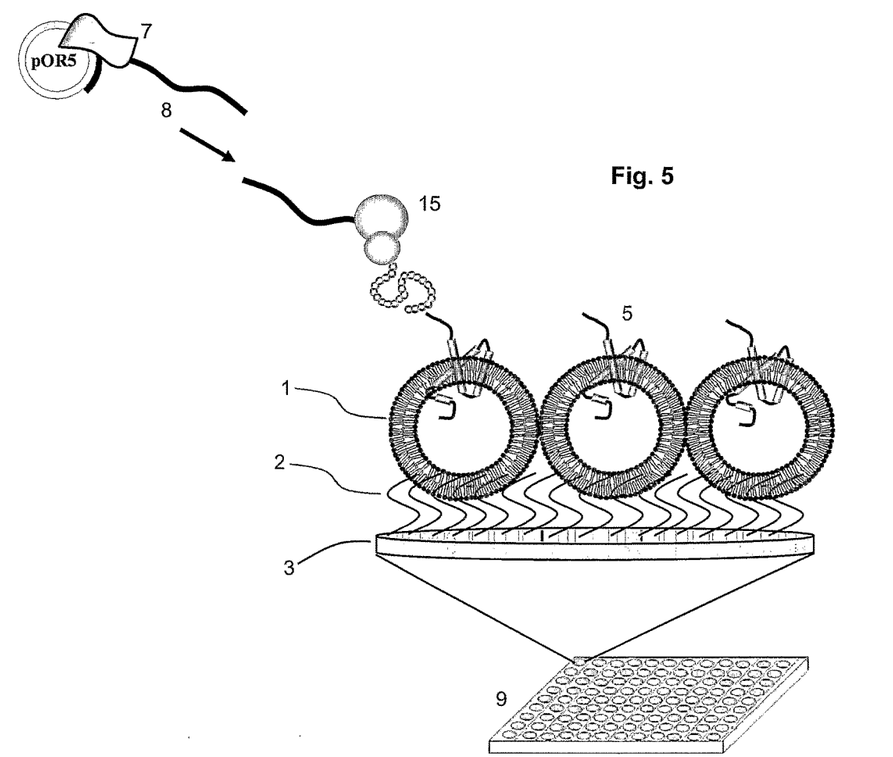
FIG. 5 is a schematic representation of direct synthesis of a membrane protein (5) into polymer vesicles (1) (2: linking moieties; 3: polyacrylamide as supporting matrix; 7: RNA polymerase; 8: mRNA; 9: multiwell plate; 15: ribosome).
Figure 6:
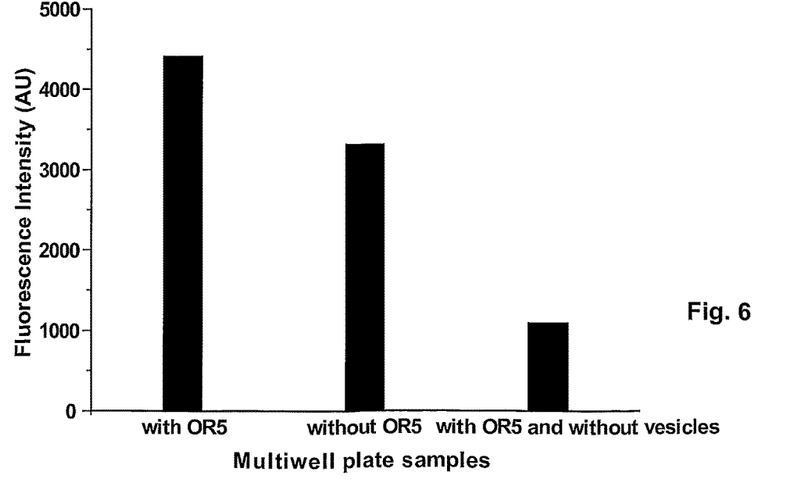
FIG. 6 depicts the fluorescence intensity of specifically bound anti-mouse-secondary Cy5 antibody in wells of a multiwell plate.

FIG. 5 illustrates the schematic of the incorporation of in vitro synthesized membrane proteins into the anchored polymer vesicles on a matrix in a Microtiter® well. After the in vitro mixture incubation, the Microtiter® plate was subjected to immunostaining with primary anti-vsv antibody and anti-mouse-cy5 conjugated secondary antibody. Non-specifically bound secondary antibody was washed with PBS and the fluorescence intensity of the specifically bound antibody was measured at wavelengths (Excitation 650 nm/Emission 680 nm). FIG. 6 shows the fluorescence intensity for the sample with OR5 cDNA is higher than that without cDNA of OR5.

Figure 7:
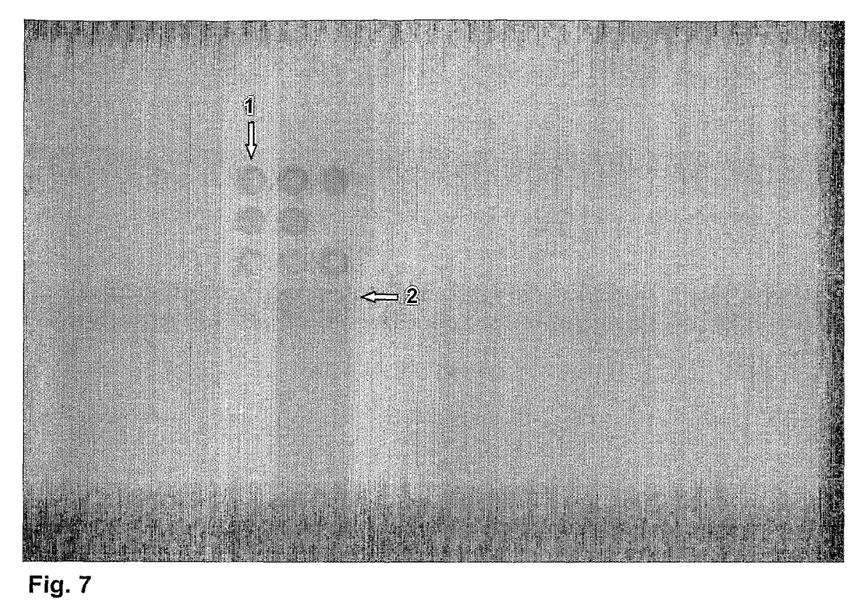
FIG. 7 depicts the immunostaining of expressed proteins with the respective antibodies based on a chemiluminescence assay (1: GPCR OR5; 2: without vesicles). In each well, after performing cell-free expression or control, respectively, primary anti-VSV antibody was added. An anti-mouse antibody (from Westernbreeze Kit) was selected as the secondary antibody and incubated for 40 min. Subsequently the chemilumiscence substrate was added. The chemilumiscence in the wells of a multiwell plate is shown.
Figure 8:
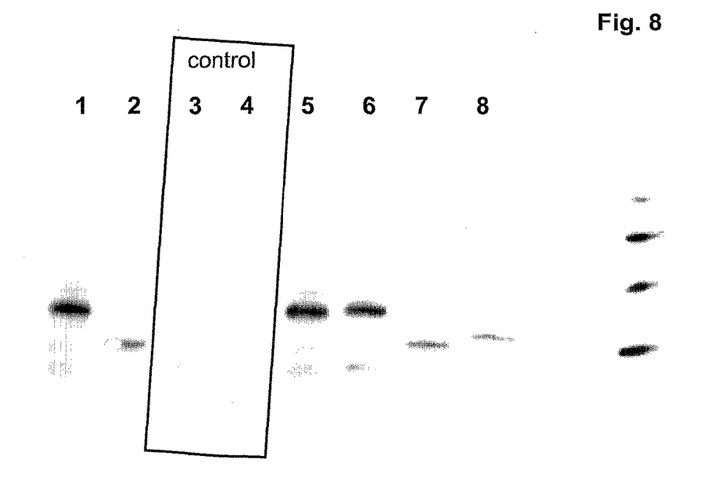
FIG. 8 depicts a Western blot of membrane proteins in robust polymer vesicles in comparison to control experiments using the same antibody as in the example shown in FIG. 7 (lane 1: OR5; lane 2: Claudin 2; lane 3: polymer vesicles (BD21) without cDNA; lane 4: polymer vesicles (BD37) without cDNA; lane 5: polymer vesicles (BD21) with OR5; lane 6: polymer vesicles (BD37) with OR5; lane 7: polymer vesicles (BD21) with Claudin 2; lane 7: polymer vesicles (BD37) with Claudin 2; polymer vesicles (BD21)=21 repeating units of hydrophobic block copolymer; polymer vesicles (BD37)=37 repeating units of hydrophobic block copolymer).
Figure 9:
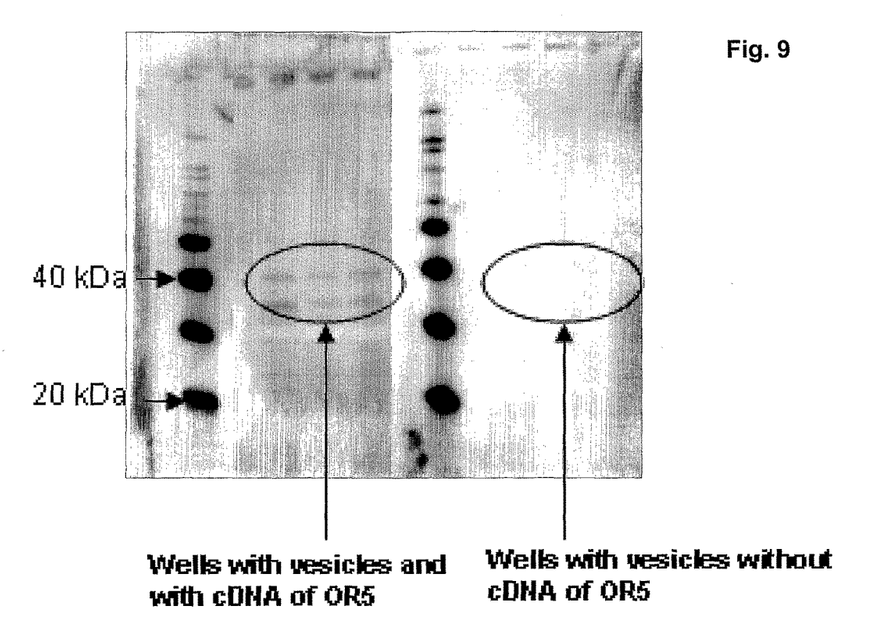
FIG. 9 depicts a Western blot of samples from the wells having polymer vesicles with and without cDNA, using the same antibody as in the example shown in FIG. 7.

In addition, the samples with cDNA and without polymer vesicle show less intensity for immunostaining indicating that the polymer vesicles are necessary for proper orientation of OR5 as shown in FIG. 7. However, FIG. 8 and FIG. 9 illustrate that all the samples with cDNA showed bands with respective molecular weights and the controls without cDNA do not show bands on Western blot.

Thus the following aspects of the invention are demonstrated:
a) Vesicles can be formed by PB-PEO block copolymer and bound onto a surface
b) Membrane proteins can be incorporated into the vesicles
c) In vitro synthesis of membrane proteins directly on to the polymer vesicles is possible.

This method enables screening of mutated libraries of membrane proteins produced by in vitro synthesis. In addition, all steps (synthesis, sample application and read-out) are fully compatible with automation via robotic-based pipetting, microfluidics and appropriate read-out strategies, as electronics and/or optics.

The encapsulation of calcein as demonstrated in Example 3 can be replaced by redox potential dyes which then interact with membrane proteins synthesized and inserted on to the wall of the polymer vesicle. This can enable development of color change sensors similar to pH paper/dye.

Example 4

Fluorescence Assays

In order to verify the expression of OR5, primary anti-vsv-antibody and anti-mouse-Cy5 conjugate secondary antibody were diluted in PBS containing 2% (w/v) BSA and added to the micro-titer plate. After each step, the Microtiter® plate was washed with PBS to remove the antibodies which are non-specific. The Microtiter® plate was read at excitation (650 nm) and emission (680 nm) to analyse the presence of secondary-antibody.

In addition to fluorescence assays, samples were loaded on to a SDS poly-acrylamide gel and immuno-Western blotting was performed as per the supplier's (Invitrogen) Western blotting protocol.

The listing or discussion of a previously published document in this specification should not necessarily be taken as an acknowledgement that the document is part of the state of the art or is common general knowledge.

The invention illustratively described herein may suitably be practiced in the absence of any element or elements, limitation or limitations, not specifically disclosed herein. Thus, for example, the terms "comprising", "including," containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by exemplary embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims. In addition, where features or aspects of the invention are described in terms of Markush groups, those skilled in the art will recognize that the invention is also thereby described in terms of any individual member or subgroup of members of the Markush group.

What is claimed is:

1. A process of forming a vesicle with an associated membrane protein, comprising:
    providing a vesicle having a circumferential membrane of an amphiphilic polymer, wherein the vesicle is a synthetic polymer vesicle and the amphiphilic polymer is a synthetic block copolymer, the amphiphilic polymer comprising a molecule with a non-polar moiety, wherein a portion of the non-polar moiety of the molecule is integrated into the circumferential membrane of the vesicle, wherein the molecule with the non-polar moiety is capable of coupling the vesicle to a surface via a covalent or non-covalent bond, the non-polar moiety being one of an aliphatic, an alicyclic, an aromatic and an arylaliphatic moiety,
    wherein the non-polar moiety comprises a main chain of 3 to about 30 carbon atoms and 0 to about 12 heteroatoms selected from Si, O, S, N, and Se; and
    contacting the vesicle with a cell-free expression system and a nucleic acid molecule encoding the associated membrane protein under conditions suitable for transcription and translation of the nucleic acid molecule such that the associated membrane protein is formed in situ and associated with the circumferential membrane of the amphiphilic polymer of the vesicle, wherein the associated membrane protein is an odorant receptor 5 protein, an alpha-hemolysin protein, or a claudin-2 protein,
    wherein a portion of the associated membrane protein is integrated into the circumferential membrane of the amphiphilic polymer of the vesicle,
    wherein the amphiphilic polymer is a diblock (A-B) or a triblock copolymer (A-B-A or A-B-C),
    wherein the cell-free expression system is selected from the group consisting of eukaryotic cell-free expression system, prokaryotic cell-free expression system, and archaic cell-free expression system.

2. The process of claim 1, wherein the associated membrane protein comprises a transmembrane protein.

3. The process of claim 1, wherein the transmembrane protein is the odorant receptor 5 protein.

4. The process of claim 1, wherein the amphiphilic polymer has a glass transition temperature below ambient temperature.

5. The process of claim 1, wherein the amphiphilic polymer comprises a polyether block selected from an oligo(oxyethylene) block, a poly(oxyethylene) block, an oligo(oxypropylene) block, a poly(oxypropylene) block, an oligo(oxybutylene) block and a poly(oxybutylene) block.

6. The process of claim 5, wherein the amphiphilic polymer is a poly(butadiene)-poly(ethylene oxide) (PB-PEO) diblock copolymer.

* * * * *